(12) United States Patent
Chen et al.

(10) Patent No.: US 8,689,000 B2
(45) Date of Patent: Apr. 1, 2014

(54) USE OF CERTIFIED SECRETS IN COMMUNICATION

(75) Inventors: Liqun Chen, Bristol (GB); Wenbo Mao, Beijing (CN); Caroline Jessica Belrose, Marlborough (GB); Graeme John Proudler, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2274 days.

(21) Appl. No.: 10/557,953

(22) PCT Filed: May 21, 2004

(86) PCT No.: PCT/GB2004/002185
§ 371 (c)(1),
(2), (4) Date: Mar. 5, 2007

(87) PCT Pub. No.: WO2004/104797
PCT Pub. Date: Dec. 2, 2004

(65) Prior Publication Data
US 2007/0256125 A1    Nov. 1, 2007

(30) Foreign Application Priority Data

May 21, 2003  (GB) .................................. 0311668.8
May 28, 2003  (GB) .................................. 0312179.5

(51) Int. Cl.
*H04L 9/32*       (2006.01)
*H04L 29/06*     (2006.01)

(52) U.S. Cl.
CPC .......... *H04L 9/3255* (2013.01); *H04L 63/0823* (2013.01)

USPC .............. 713/180; 713/176; 713/182; 726/2; 726/10

(58) Field of Classification Search
USPC ........................................................ 713/156
See application file for complete search history.

(56) References Cited

U.S. PATENT DOCUMENTS

| 5,757,920 A | 5/1998 | Misra et al. ...................... 380/25 |
| 6,039,248 A | 3/2000 | Park et al. ...................... 235/379 |
| 6,052,467 A | 4/2000 | Brands .......................... 380/279 |
| 6,532,540 B1 | 3/2003 | Kocher .......................... 713/158 |

(Continued)

FOREIGN PATENT DOCUMENTS

| EP | 0 804 003 A2 | 10/1997 |
| EP | 1 113 617 A2 | 7/2001 |

(Continued)

OTHER PUBLICATIONS

Bresson, E. and J. Stern, "Efficient Revocation in Group Signatures," *Public Key Cryptography, International Workshop on Practice and Theory in Public Key Cryptography*, pp. 190-206 (2001).

(Continued)

*Primary Examiner* — Matthew Henning

(57) ABSTRACT

A method is described by which the possessor of a secret certified in a particular manner can prove to a party with which the possessor of a secret needs to interact that it does indeed possess a secret formed in the proper manner. In the context of trusted computing apparatus, this can be used to show that the secret has been provided by a legitimate manufacturer of such apparatus. A method and an architecture for revocation operable in this context is also described.

15 Claims, 6 Drawing Sheets

(56) References Cited

U.S. PATENT DOCUMENTS

| | | | |
|---|---|---|---|
| 7,543,139 B2* | 6/2009 | Camenisch et al. | 713/156 |
| 2002/0014527 A1 | 2/2002 | Sawada | 235/380 |
| 2003/0093668 A1* | 5/2003 | Multerer et al. | 713/161 |
| 2003/0115468 A1* | 6/2003 | Aull et al. | 713/175 |
| 2004/0054779 A1* | 3/2004 | Takeshima et al. | 709/225 |
| 2004/0139325 A1* | 7/2004 | De Boursetty et al. | 713/176 |
| 2007/0255661 A1* | 11/2007 | Yoshida et al. | 705/74 |

FOREIGN PATENT DOCUMENTS

| | | |
|---|---|---|
| GB | 2 372 344 A | 8/2002 |
| WO | 01/29637 A2 | 4/2001 |
| WO | 01/93497 A1 | 12/2001 |
| WO | 02/42935 A2 | 5/2002 |

OTHER PUBLICATIONS

Camenisch J. and M. Stadler, "Efficient Group Signature Schemes for Large Groups," *Advances in Cryptology—Crypto '97*, Berlin, vol. Conf. 17, pp. 410-424 (Aug. 17, 1997).

Kim, H., et al., "Efficient and Secure Member Deletion in Group Signature Schemes," *ASIACRYPT, International Conference on the Theory and Application of Cryptology and Information Security*, pp. 150-161 (Dec. 8, 2000).

Smart, N., *Cryptography: An Introduction*, 13.3, McGraw-Hill Education, pp. 285-289 (2003).

* cited by examiner

US 8,689,000 B2

USE OF CERTIFIED SECRETS IN COMMUNICATION

FIELD OF INVENTION

The present invention relates to provision (and revocation) of certified secrets and communication using such secrets, in particular communication that can indicate that one party possesses a secret formed in a particular way without revealing the secret itself. The present invention is particularly relevant to trusted computing (for example of the type discussed by the Trusted Computing Group), in which one party has some assurance that a second party will behave in an expected manner.

DISCUSSION OF PRIOR ART

A recent development is the provision of computing apparatus that is "trusted"—That is, it can be relied on by the user to behave in a predictable manner and that subversion by another will at the least be apparent. In the Trusted Computing Groupspecification (found at www.trustedcomputing.org) and in the associated book "Trusted Computing Platforms: TCPA Technology in Context", edited by Siani Pearson and published July 2002 by Prentice Hall PTR (the contents of which are incorporated by reference herein to the extent permissible by law), there is described an approach to trusted computing which employs a trusted coprocessor (both physically and logically protected from subversion) to assure a user of computing apparatus including or associated with the trusted coprocessor that it is performing in a predictable and unsubverted manner. A particularly useful arrangement, particularly where it is desirable to provide information and services for other computers, is to use both a compartmentalised operating system (typically by operating in a compartmentalised manner such that processes run in separated computing environments that have strictly controlled interaction with other computing environments) and trusted computing hardware using a trusted component (such an arrangement is discussed in, for example, the applicants' patent application published as EP1182557).

One advantage of using a trusted platform is that other parties will be ready to interact with the trusted platform as they have a means of assuring that it will behave in an expected manner. Such an other party may be a Remote Service Provider (RSP) who is able to provide a service to a platform, but may be unwilling to provide this service if it cannot be assured that the platform receiving the service is indeed trusted. It can be assumed that the RSP will trust at least some manufacturers of trusted components (trusted components are described here as Trusted Platform Modules or TPMs), which leaves the difficulty for the RSP being to ensure that TPMs interacting with the RSP have indeed been produced by a trusted manufacturer. There is a further consideration—it is desirable for privacy reasons for the RSP to be unable to distinguish which TPM it is interacting with (ie, desirably all that the RSP will be able to establish is that it is interacting with a bona fide TPM manufactured by a known—and trusted—manufacturer).

The current approach to providing such an assurance to an RSP is to use a further third party, a Certificate Authority (CA), trusted by both the platform's owner and the RSP. The TPM manufacturer provides a unique endorsement key for the TPM and then certifies it. The CA then issues a certificate on a randomly chosen identity after verifying the manufacturer's certificate. The CA may or may not maintain a list of the mapping between endorsement keys and corresponding certificates. It is then the CA's certificate that is used by the RSP to check the validity of the TPM—if the certificate is verified, the RSP will trust the TPM to be a legitimate product of the trusted manufacturer because the RSP trusts the CA. If the RSP finds out something wrong with a particular certificated identity, the RSP reports this to the CA and the CA puts the problem identity in a revocation list and then refuses to certify any new identity to this TPM.

A difficulty with this scheme is that the CA is now a weak point in the system—it potentially possesses a mapping between a TPM's Endorsement Key and identities issued to that TPM (and probably that of a large number of TPMs). If the CA reneges on a promise not to maintain such a mapping, or if the CA is permitted to keep such mappings as long as they are confidential but the CA's database is compromised, it becomes possible to correlate the identities of all TPMs which have been certified by that CA.

It is therefore desirable for a TPM to be able to assure an RSP that it is the legitimate product of a trusted manufacturer without trusting a third party such as a CA with attestation information given by a manufacturer to the TPM. It is also desirable for this to be done in such a way that the status of the TPM can be revoked without allowing RSPs to become aware of the attestation information given by a manufacturer to the TPM that it is interacting with at any given time.

It can be appreciated that these problems can have broader application to communication between parties than the specific problem identified here in relation to trusted computing platforms—for example, the problem can apply whenever similar trust relationships exist in relation to a secret between a possessor of the secret, a guarantor of the secret, and a party relying on the validity of the secret.

SUMMARY OF INVENTION

Accordingly in a first aspect, the invention provides method of determining access to computational resources by means of a group signature scheme with revocation evidence, the method comprising: a certificate issuer holding a group secret key and providing a group public key; a group member obtaining a membership secret and the certificate issuer providing a membership certificate for a group member in respect of the membership secret; the group member demonstrating that it possesses a valid membership secret and a valid membership certificate to a verifier without revealing the membership secret or the membership certificate to the verifier by providing a signature, and providing revocation evidence from its membership secret and a revocation parameter; the verifier determining from the signature and from the revocation evidence that the group member possesses a valid membership secret and a valid membership certificate.

In a further aspect, the invention provides a method of demonstrating a trust status by a member of a group signature scheme which has a group public key, the method comprising: the group member obtaining a membership secret and receiving from a certificate issuer a membership certificate for a group member in respect of the membership secret; the group member demonstrating that it possesses a valid membership secret and a valid membership certificate to a verifier without revealing the membership secret or the membership certificate to the verifier by providing a signature, and providing revocation evidence from its membership secret and a revocation parameter.

In a further aspect, the invention provides a method of verifying a trust status of a member of a group signature scheme which has a group public key, the method comprising: the verifier receives from a group member a signature generated from a membership secret and a membership certificate of the group member, and receives revocation evidence provided by the group member from its membership secret and a revocation parameter; and the verifier determining from the signature and from the revocation evidence that the group member possesses a valid membership secret and a valid membership certificate.

In a further aspect, the invention provides a trusted computing apparatus comprising a processor and a memory containing a membership secret and a membership certificate issued on the membership secret by a certificate issuer for a group signature scheme having a group public key, the trusted computing apparatus being adapted to demonstrate that it possesses a valid membership secret and a valid membership certificate to a verifier without revealing the membership secret or the membership certificate to the verifier by providing a signature, and to provide revocation evidence from its membership secret, its membership certificate, the group public key and a revocation parameter.

In a further aspect, the invention provides a method by which a first party can prove to a second party that it possesses a secret legitimately provided by a third party, comprising the steps of:

the third party providing to the first party a first secret m, and a second secret c calculated according to the relation $c=(t_1 m^{e_2}+t_2)^{d_1}$ mod n from the first secret, where n is a RSA modulus, $e_1$ and $e_2$ are RSA public exponents, and $t_1$ and $t_2$ are randomly chosen integers, whereby $d_1$ is an RSA private exponent corresponding to $e_1$, the second party obtaining from the third party n, $e_1$, $e_2$, $t_1$ and $t_2$;

in order to prove to the second party that it has a first secret in and a second secret c formed according to the relation, the first party provides the second party with a first plurality of results of a one-way function using the first secret and a second plurality of results of a one-way function using the second secret;

whereby the second party compares the first plurality of results with results of a one-way function using $e_1$ and the second plurality of results with results of a one-way function using $e_2$, and thereby verifying that the second party has a first secret in and a second secret c formed according to the relation without receiving either the first secret m or the second secret c.

In a related aspect, the invention provides trusted computing apparatus comprising a processor and a memory containing a first secret m, and a second secret c calculated according to the relation $c=(t_1 m^{e_2}+t_2)^{d_1}$ mod n from the first secret, where n is a RSA modulus, $e_1$ and $e_2$ are RSA public exponents, and $t_1$ and $t_2$ are randomly chosen integers, whereby $d_1$ is an RSA private exponent corresponding to $e_1$, wherein the processor is programmed to prove to an other party that it possesses a first secret m and a second secret c formed according to the relation without revealing either the first secret m or the second secret c, by providing the other party with a first plurality of results of a one-way function using the first secret and a second plurality of results of a one-way function using the second secret.

In a further aspect, the invention provides a method of controlling access of a first party to a service provided by a second party, wherein the first party is adapted to prove to another party that it possesses a secret legitimately provided by a third party without revealing the secret, comprising the steps of:

the first party proving and the fourth party verifying that the first party possesses a secret legitimately provided by the third party without the secret being revealed to the fourth party, the fourth party issuing a certificate to the first party and associating with the certificate an identifier of the step of verifying that the first party possesses a secret legitimately provided by the third party that would be regenerated in a later step of verifying that a party possesses that secret, the fourth party maintains certificate validity information, whereby when the first party attempts to obtain access to the service, it provides the certificate issued by the fourth party to the second party, and the second party determines from certificate validity information provided by the fourth party whether the certificate is valid before providing access to the service.

Preferably, a group member is a computing apparatus and the certificate issuer is a manufacturer of the computing apparatus. More specifically, the computing apparatus is preferably a trusted computing module adapted to be physically and logically resistant to unauthorised modification, and preferably adapted for use as a coprocessor of a computing platform.

BRIEF DESCRIPTION OF DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF SPECIFIC EMBODIMENTS

Figure 1:
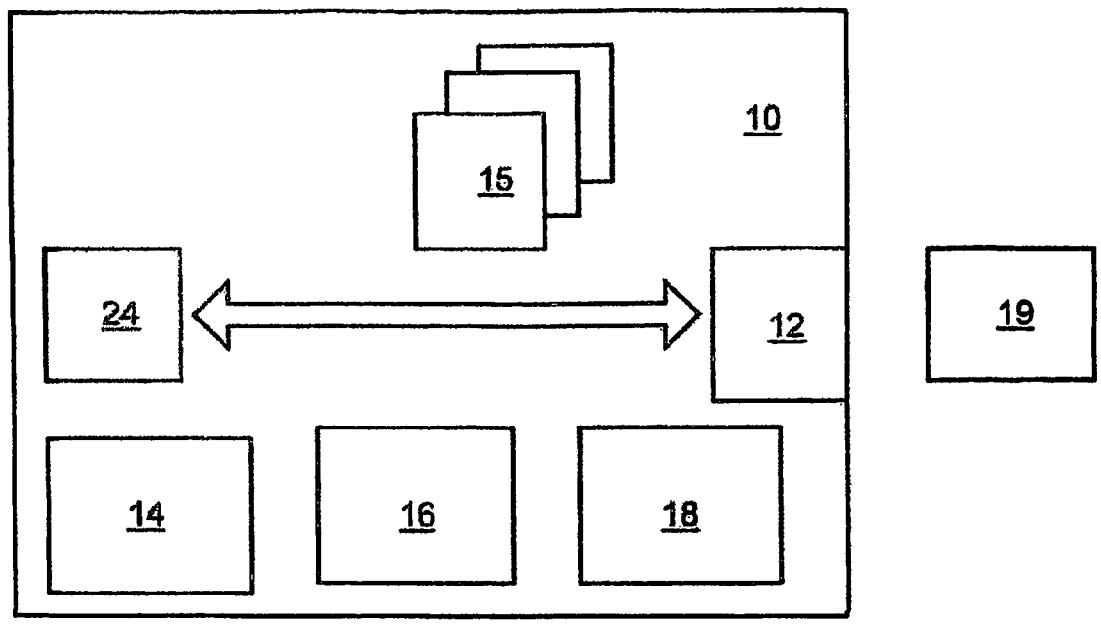
FIG. 1 is a diagram that illustrates schematically a system capable of implementing embodiments of the present invention.

A trusted platform of the type discussed in the Trusted Computing Platform Alliance specification will now be described. Such platforms are described in earlier applications by the present applicants, in particular, International Patent Application Publication Nos. WO00/48063 and WO00/54126 which are incorporated by reference herein to the greatest extent possible under applicable law. The elements of an exemplary trusted platform and its operation will first be described—the elements and operation of a second embodiment of the invention will then be described with reference to the preceding general discussion of trusted platforms.

In this specification, the term "trusted" when used in relation to a physical or logical component, is used to mean that the physical or logical component always behaves in an expected manner. The behavior of that component is predictable and known. Trusted components have a high degree of resistance to unauthorized modification.

In this specification, the term "computer platform" is used to refer to a computer system comprising at least one data processor and at least one data storage means, usually but not essentially with associated communications facilities e.g. a plurality of drivers, associated applications and data files, and which may be capable of interacting with external entities e.g. a user or another computer platform, for example by means of connection to the internet, connection to an external network, or by having an input port capable of receiving data stored on a data storage medium, e.g. a CD ROM, floppy disk, ribbon tape or the like. The term "computer platform" encompasses the main data processing and storage facility of a computer entity.

By use of a trusted component in each computer entity, there is enabled a level of trust between different computing platforms. It is possible to query such a platform about its state, and to compare it to a trusted state, either remotely, or through a monitor on the computer entity. The information gathered by such a query is provided by the computing entity's trusted component which monitors the various parameters of the platform. Information provided by the trusted component can be authenticated by cryptographic authentication, and can be trusted. A "trusted platform" can thus be achieved by the incorporation into a computing platform of a physical trusted device whose function is to bind the identity of the platform to reliably measured data that provides an integrity metric of the platform. The identity and the integrity metric are compared with expected values provided by a trusted party (TP) that is prepared to vouch for the trustworthiness of the platform. If there is a match, the implication is that at least part of the platform is operating correctly, depending on the scope of the integrity metric.

The presence of the trusted component makes it possible for a piece of third party software, either remote or local to the computing entity to communicate with the computing entity in order to obtain proof of its authenticity and identity and to retrieve measured integrity metrics of that computing entity. For a human user to gain a level of trustworthy interaction with his or her computing entity, or any other computing entity which that person may interact with by means of a user interface, a trusted token device is used by a user to interrogate a computing entity's trusted component and to report to the user on the state of the computing entity, as verified by the trusted component. Authentication between the trusted component and the trusted token device is, in practical situations of interest, mutual—the user is authenticated by the trusted component, and (if the user has appropriate privileges) may be allowed to control it, and the trusted component is authenticated by the user (and recognised as a trusted component, and in appropriate circumstances a trusted component owned or controllable by the user).

The advantages and use in applications of a trusted platform of this type are discussed in some detail in International Patent Application Publication Nos. WO00/48063 and WO00/54126 and in considerable detail in "Trusted Computing Platforms: TCPA Technology in Context", and will not be described further here.

The trusted component in such an arrangement uses cryptographic processes. A most desirable implementation would be to make the trusted component tamper-proof, to protect secrets by making them inaccessible to other platform functions and provide an environment that is substantially immune to unauthorised modification. Since complete tamper-proofing is impossible, the best approximation is a trusted device that is tamper-resistant, or tamper-detecting. The trusted device, therefore, preferably consists of one physical component that is tamper-resistant. Techniques of tamper-resistance are well known to the skilled person, and are discussed further in International Patent Application Publication Nos. WO00/48063 and WO00/54126

Figure 4:
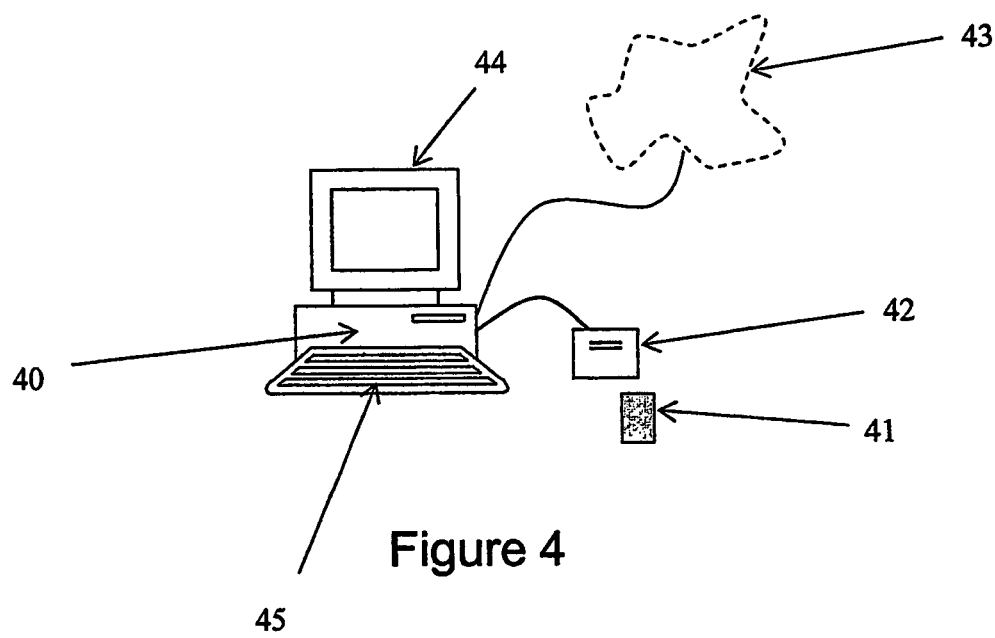
FIG. 4 illustrates the elements of a computer system suitable for carrying out embodiments of the invention.

A trusted platform 10, 40 is illustrated schematically in the diagram in FIG. 1 (and graphically in FIG. 4). The platform 10, 40 includes the standard features of a keyboard 14, 45, mouse 16 (not shown in FIG. 4) and monitor 18, 44, which provide the physical 'user interface' of the platform. This embodiment of a trusted platform also contains a smart card reader 12, 42. Alongside the smart card reader 12, 42 there is illustrated a smart card 19, 41 to allow trusted user interaction with the trusted platform. In the platform 10, 40 there are (shown in FIG. 1) a plurality of modules 15: these are other functional elements of the trusted platform of essentially any kind appropriate to that platform. The functional significance of such elements is not relevant to the present invention and will not be discussed further herein. Additional components of the trusted computer entity will typically include one or more local area network (LAN) ports, one or more modem ports, and one or more power supplies, cooling fans and the like. In FIG. 4 the computing platform 40 is shown connected to a network 43 (which could be a LAN, a network such as the public internet accessed by a modem, or any other form of network with appropriate connection), as is clearly relevant to the embodiments of the invention described below.

Figure 2:
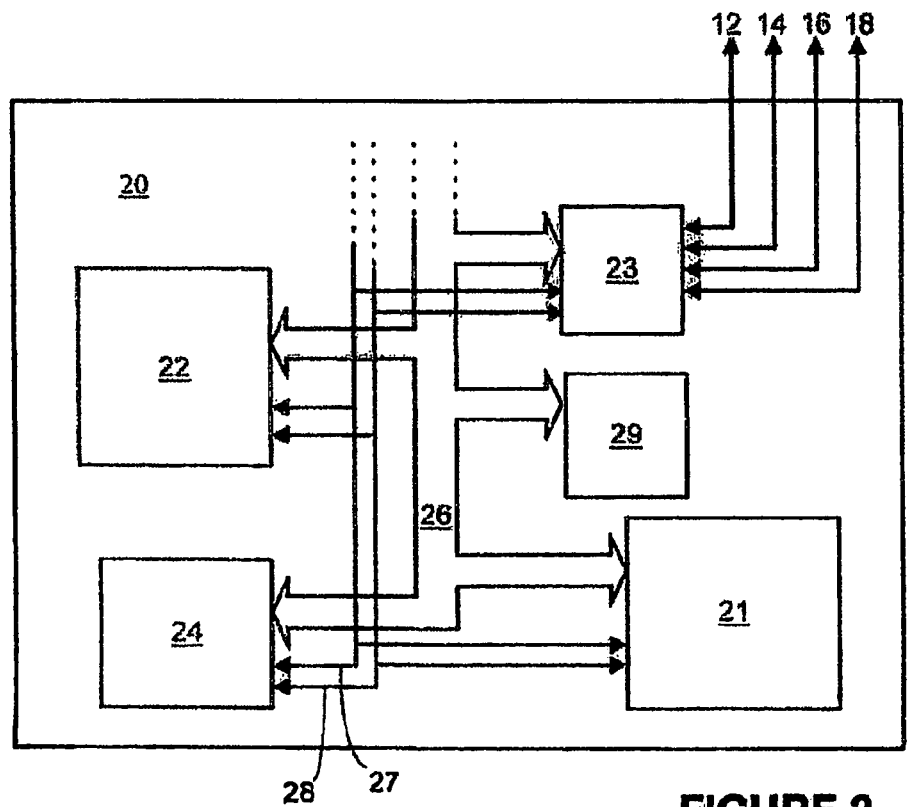
FIG. 2 is a diagram which illustrates a motherboard including a trusted device arranged to communicate with a smart card via a smart card reader and with a group of modules.

As illustrated in FIG. 2, the motherboard 20 of the trusted computing platform 10 includes (among other standard components) a main processor 21, main memory 22, a trusted device 24 (the physical form of the trusted component described above), a data bus 26 and respective control lines 27 and lines 28, BIOS memory 29 containing the BIOS program for the platform 10 and an Input/Output (IO) device 23, which controls interaction between the components of the motherboard and the smart card reader 12, the keyboard 14, the mouse 16 and the monitor 18 (and any additional peripheral devices such as a modem, printer, scanner or the like). The main memory 22 is typically random access memory (RAM). In operation, the platform 10 loads the operating system (and the processes or applications that may be executed by the platform), for example Windows XP™, into RAM from hard disk (not shown).

The computer entity can be considered to have a logical, as well as a physical, architecture. The logical architecture has a same basic division between the computer platform, and the trusted component, as is present with the physical architecture described in FIGS. 1 to 3 herein. That is to say, the trusted component is logically distinct from the computer platform to which it is physically related. The computer entity comprises a user space being a logical space which is physically resident on the computer platform (the first processor and first data storage means) and a trusted component space being a logical space which is physically resident on the trusted component. In the user space are one or a plurality of drivers, one or a plurality of applications programs, a file storage area; smart card reader; smart card interface; and a software agent which can perform operations in the user space and report back to trusted component. The trusted component space is a logical area based upon and physically resident in the trusted component, supported by the second data processor and second memory area of the trusted component. Monitor 18 receives images directly from the trusted component space. External to the computer entity are external communications networks e.g. the Internet, and various local area networks, wide area networks which are connected to the user space via the drivers (which may include one or more modem ports). An external user smart card inputs into smart card reader in the user space.

Typically, in a personal computer the BIOS program is located in a special reserved memory area, the upper 64K of the first megabyte of the system memory (addresses FØØØh to FFFFh), and the main processor is arranged to look at this memory location first, in accordance with an industry wide standard.

The significant difference between the platform and a conventional platform is that, after reset, the main processor is initially controlled by the trusted device, which then hands control over to the platform-specific BIOS program, which in turn initialises all input/output devices as normal. After the BIOS program has executed, control is handed over as normal by the BIOS program to an operating system program, such as Windows XP™, which is typically loaded into main memory 22 from a hard disk drive (not shown).

Clearly, this change from the normal procedure requires a modification to the implementation of the industry standard, whereby the main processor 21 is directed to address the trusted device 24 to receive its first instructions. This change may be made simply by hard-coding a different address into the main processor 21. Alternatively, the trusted device 24 may be assigned the standard BIOS program address, in which case there is no need to modify the main processor configuration.

A relatively secure platform can however be achieved without such a fundamental change. In such implementations, the platform is still controlled by the BIOS at switch-on, so the BIOS (or at least the BIOS boot block) must also be trusted. This means that there will not be a single root-of-trust (as in the preferred trusted platform embodiment described) but two—the BIOS boot block will also be a root of trust.

It is highly desirable for the BIOS boot block to be contained within the trusted device 24. This prevents subversion of the obtaining of the integrity metric (which could otherwise occur if rogue software processes are present) and prevents rogue software processes creating a situation in which the BIOS (even if correct) fails to build the proper environment for the operating system.

Figure 3:
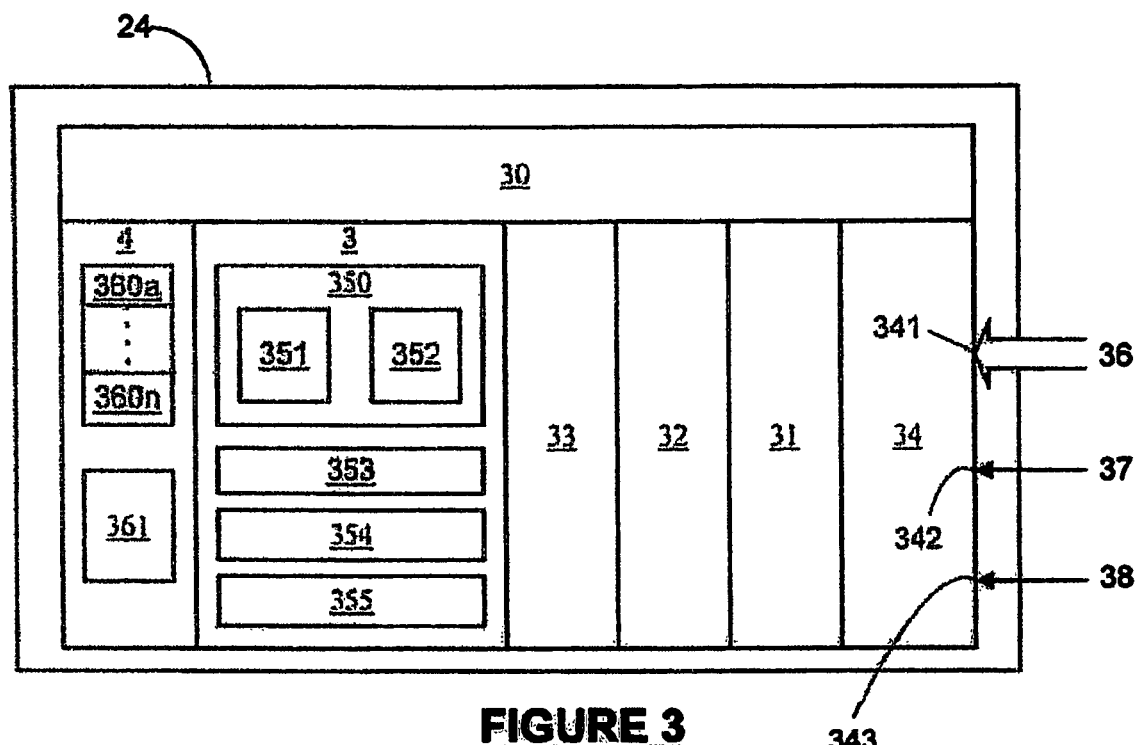
FIG. 3 is a diagram that illustrates the trusted device of FIG. 2 in more detail.

The trusted device 24 comprises a number of blocks, as illustrated in FIG. 3. After system reset, the trusted device 24 performs an authenticated boot process to ensure that the operating system of the platform 10 (including the system clock and the display on the monitor) is running properly and in a secure manner—more accurately, to ensure that the state of the platform is reliably recorded. During the authenticated boot process, the trusted device 24 acquires an integrity metric of the computing platform 10. The trusted device 24 can also perform secure data transfer and, for example, authentication between it and a smart card via encryption/decryption and signature/verification. The trusted device 24 can also securely enforce various security control policies, such as locking of the user interface.

Specifically, the trusted device comprises: a controller 30 programmed to control the overall operation of the trusted device 24, and interact with the other functions on the trusted device 24 and with the other devices on the motherboard 20; a measurement function 31 for acquiring the integrity metric from the platform 10; a cryptographic function 32 for signing, encrypting or decrypting specified data; an authentication function 33 for authenticating a smart card; and interface circuitry 34 having appropriate ports (36, 37 & 38) for connecting the trusted device 24 respectively to the data bus 26, control lines 27 and address lines 28 of the motherboard 20. Each of the blocks in the trusted device 24 has access (typically via the controller 30) to appropriate volatile memory areas 4 and/or non-volatile memory areas 3 of the trusted device 24. Additionally, the trusted device 24 is designed, in a known manner, to be tamper resistant.

In a preferred arrangement, the monitor 18 may be driven directly by a monitor subsystem contained within the trusted component itself. In this embodiment, in the trusted component space are resident the trusted component itself, and displays generated by the trusted component on monitor 18. This arrangement is described further in the applicant's International Patent Application Publication No. WO00/73879, which is incorporated by reference herein.

For reasons of performance, the trusted device 24 may be implemented as an application specific integrated circuit (ASIC). However, for flexibility, the trusted device 24 is preferably an appropriately programmed micro-controller. Both ASICs and micro-controllers are well known in the art of microelectronics and will not be considered herein in any further detail.

One item of data stored in the non-volatile memory 3 of the trusted device 24 is a certificate 350. The certificate 350 contains at least a public key 351 of the trusted device 24 and an authenticated value 352 of a platform integrity metric measured by a trusted party (TP). The certificate 350 is signed by the TP using the TP's private key prior to it being stored in the trusted device 24. In later communications sessions, a user of the platform 10 can verify the integrity of the platform 10 by comparing the acquired integrity metric with the authentic integrity metric 352. If there is a match, the user can be confident that the platform 10 has not been subverted. Knowledge of the TP's generally-available public key enables simple verification of the certificate 350. The non-volatile memory 35 also contains an identity (ID) label 353. The ID label 353 is a conventional ID label, for example a serial number, that is unique within some context. The ID label 353 is generally used for indexing and labelling of data relevant to the trusted device 24, but is insufficient in itself to prove the identity of the platform 10 under trusted conditions.

The trusted device 24 is equipped with at least one method of reliably measuring or acquiring the integrity metric of the computing platform 10 with which it is associated. This gives a potential user of the platform 10 a high level of confidence that the platform 10 has not been subverted at a hardware, or BIOS program, level. Other known processes, for example virus checkers, will typically be in place to check that the operating system and application program code has not been subverted.

The measurement function 31 has access to: non-volatile memory 3 for storing a hash program 354 and a private key 355 of the trusted device 24, and volatile memory 4 for storing acquired integrity metric in the form of a digest 361. In appropriate embodiments, the volatile memory 4 may also be used to store the public keys and associated ID labels 360a-360n of one or more authentic smart cards 19 that can be used to gain access to the platform 10.

Acquisition of an integrity metric is not material to the present invention, and is not discussed further here—this process, and the process of verifying the integrity of a trusted platform by a user or a third party, are processes discussed in detail in International Patent Application Publication No. WO00/48063.

As indicated above, a preferred means for authenticating a user to a trusted platform is a token device, such as a smart card 19 (though it should be noted that a user could, for example, be a remote platform communicating with the trusted platform over a network). The user's smart card 19 is a token device, separate from the computing entity, which interacts with the computing entity via the smart card reader port 19. A user may have several different smart cards issued by several different vendors or service providers, and may gain access to the internet or a plurality of network computers from any one of a plurality of computing entities as described herein, which are provided with a trusted component and smart card reader. A user's trust in the individual computing entity to which s/he is using is derived from the interaction between the user's trusted smart card token and the trusted component of the computing entity. The user relies on their trusted smart card token to verify the trustworthiness of the trusted component.

Figure 5:
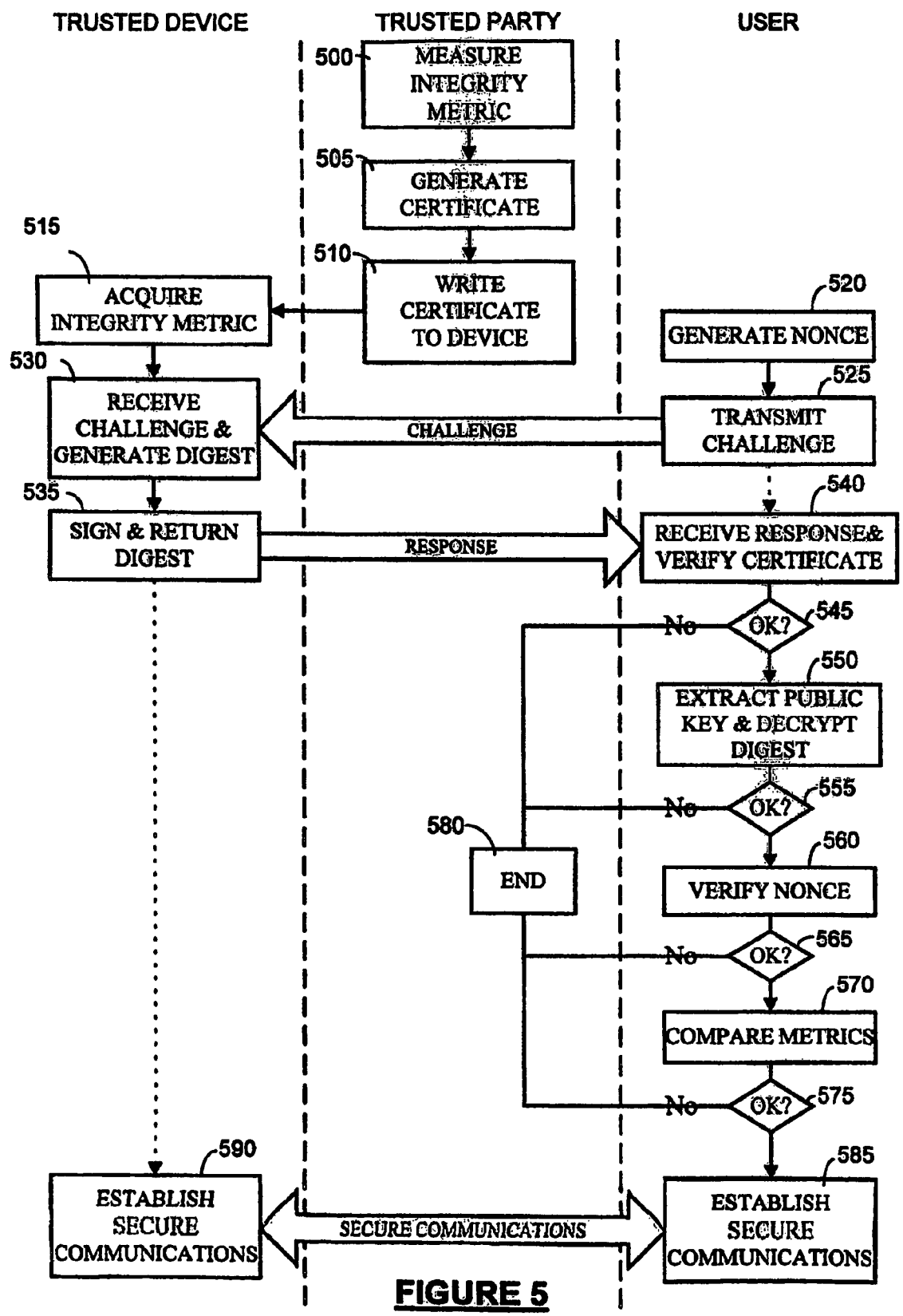
FIG. 5 is a flow diagram which illustrates the steps involved in establishing communications between a trusted computing platform and a remote platform including the trusted platform verifying its integrity in accordance with conventional trusted platform technology.

FIG. 5 illustrates the flow of actions by a Trusted Party TP, the trusted device 24 incorporated into a platform, and a user (of a remote platform) who wants to verify the integrity of the trusted platform in accordance with prior art trusted platform technology. It will be appreciated that substantially the same steps as are depicted in FIG. 5 are involved when the user is a local user. In either case, the user would typically rely on some form of software application to enact the verification. It would be possible to run the software application on the remote platform or the trusted platform. However, there is a chance that, even on the remote platform, the software application could be subverted in some way. Therefore, it is preferred that, for a high level of integrity, the software application would reside on a smart card of the user, who would insert the smart card into an appropriate reader for the purposes of verification.

At the first instance, a TP, which vouches for trusted platforms, will inspect the type of the platform to decide whether to vouch for it or not. This will be a matter of policy. If all is well, in step 500, the TP measures the value of integrity metric of the platform. Then, the TP generates a certificate, in step 505, for the platform. The certificate is generated by the TP by appending the trusted device's public key, and optionally its ED label, to the measured integrity metric, and signing the string with the TP's private key. It should be noted that the present invention is particularly relevant to improvement to this chain of events and to the role of such a Trusted Party (typically a Certificate Authority).

The trusted device 24 can subsequently prove its identity by using its private key to process some input data received from the user and produce output data, such that the input/output pair is statistically impossible to produce without knowledge of the private key. Hence, knowledge of the private key forms the basis of identity in this case. Clearly, it would be feasible to use symmetric encryption to form the basis of identity. However, the disadvantage of using symmetric encryption is that the user would need to share his secret with the trusted device. Further, as a result of the need to share the secret with the user, while symmetric encryption would in principle be sufficient to prove identity to the user, it would insufficient to prove identity to a third party, who could not be entirely sure the verification originated from the trusted device or the user.

In step 510, the trusted device 24 is initialised by writing the certificate 350 into the appropriate non-volatile memory locations 3 of the trusted device 24. This is done, preferably, by secure communication with the trusted device 24 after it is installed in the motherboard 20. The method of writing the certificate to the trusted device 24 is analogous to the method used to initialise smart cards by writing private keys thereto. The secure communications is supported by a 'master key', known only to the TP, that is written to the trusted device (or smart card) during manufacture, and used to enable the writing of data to the trusted device 24; writing of data to the trusted device 24 without knowledge of the master key is not possible.

At some later point during operation of the platform, for example when it is switched on or reset, in step 515, the trusted device 24 acquires and stores the integrity metric 361 of the platform.

When a user wishes to communicate with the platform, in step 520, he creates a nonce, such as a random number, and, in step 525, challenges the trusted device 24 (the operating system of the platform, or an appropriate software application, is arranged to recognise the challenge and pass it to the trusted device 24, typically via a BIOS-type call, in an appropriate fashion). The nonce is used to protect the user from deception caused by replay of old but genuine signatures (called a 'replay attack') by untrustworthy platforms. The process of providing a nonce and verifying the response is an example of the well-known 'challenge/response' process.

In step 530, the trusted device 24 receives the challenge and creates an appropriate response. This may be a digest of the measured integrity metric and the nonce, and optionally its ID label. Then, in step 535, the trusted device 24 signs the digest, using its private key, and returns the signed digest, accompanied by the certificate 350, to the user.

In step 540, the user receives the challenge response and verifies the certificate using the well known public key of the TP. The user then, in step 550, extracts the trusted device's 24 public key from the certificate and uses it to decrypt the signed digest from the challenge response. Then, in step 560, the user verifies the nonce inside the challenge response. Next, in step 570, the user compares the computed integrity metric, which it extracts from the challenge response, with the proper platform integrity metric, which it extracts from the certificate. If any of the foregoing verification steps fails, in steps 545, 555, 565 or 575, the whole process ends in step 580 with no further communications taking place.

Assuming all is well, in steps 585 and 590, the user and the trusted platform use other protocols to set up secure communications for other data, where the data from the platform is preferably signed by the trusted device 24.

Further refinements of this verification process are possible. It is desirable that the challenger becomes aware, through the challenge, both of the value of the platform integrity metric and also of the method by which it was obtained. Both these pieces of information are desirable to allow the challenger to make a proper decision about the integrity of the platform. The challenger also has many different options available—it may accept that the integrity metric is recognised as valid in the trusted device 24, or may alternatively only accept that the platform has the relevant level of integrity if the value of the integrity metric is equal to a value held by the challenger (or may hold there to be different levels of trust in these two cases).

The techniques of signing, using certificates, and challenge/response, and using them to prove identity, are well known to those skilled in the art of security and therefore need not be described in any more detail herein.

Figure 6:
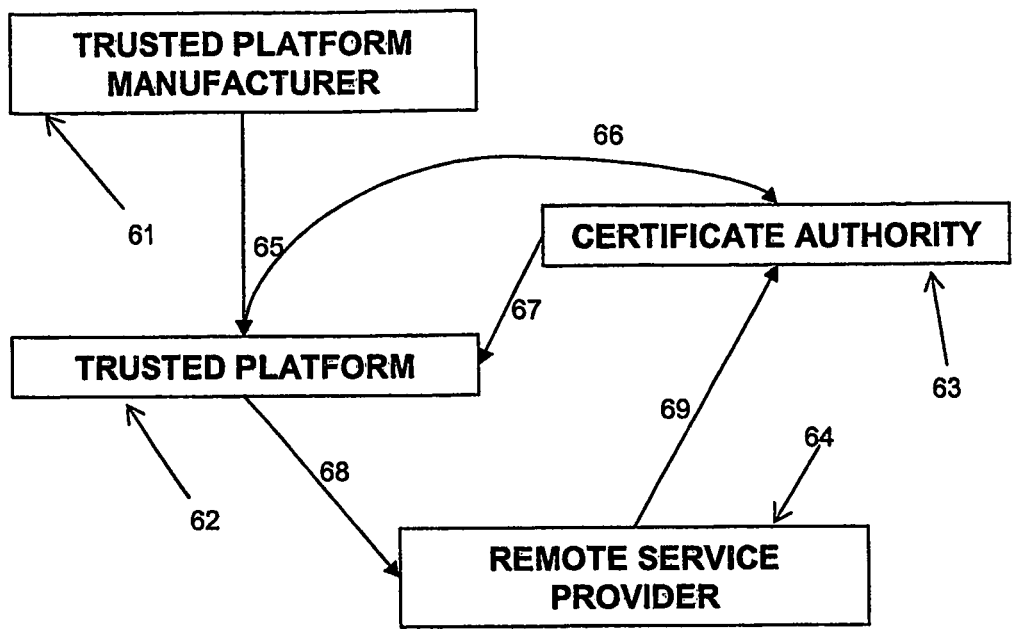
FIG. 6 shows schematically trust relationships for conventional trusted computing technology.

Specific embodiments of the invention will now be described which use and, in some cases, modify, the structures and protocols indicated above. Firstly, the situation of particular concern will be described with reference to FIG. 6, which illustrates schematically the different parties involved or potentially involved in the procurement of a service by a trusted platform from a remote service provider (RSP) and their trust relationships in conventional trusted computing technology.

The trusted platform manufacturer 61 manufactures the trusted platform module (TPM) 62 and provides it with a unique endorsement key, which the manufacturer certifies (step 65). This certificated endorsement key is then passed (step 66) to a Certificate Authority (CA) 63 trusted by the trusted platform manufacturer 61 and a certificate is issued on a randomly chosen identity, which becomes a new identity for the TPM, by the CA (step 67). In subsequent interaction with a Remote Service Provider (RSP) 64 who is able to provide a service to a platform, but may be unwilling to provide this service if it cannot be assured that the platform receiving the service is indeed trusted, the TPM 62 provides this CA certificate to the RSP 64 (step 68). The RSP 64 is then able to check by using the public data of the CA that the certificate has been validly issued by the CA 62. It is assumed here that the RSP trusts both the CA and manufacturers of genuine trusted platforms. If this is the case, there is now an effective chain of trust—the RSP trusts the CA, therefore trusts that the certificated information (which purports to show that the TPM has been certified by the trusted platform manufacturer) is valid, and therefore trusts that the TPM 62 is indeed a legitimate product of known trusted platform manufacturer 61. Privacy concerns for the trusted platform can also be met in respect of the RSP—this arrangement need not reveal to the RSP which TPM it is interacting with (ie, this can be arranged such that all that the RSP will be able to establish is that it is interacting with a bona fide TPM manufactured by a known—and trusted—manufacturer).

As indicated above, a significant difficulty with this scheme is that the CA is now a weak point in the system—it is able to correlate the identities of the TPM (and probably that of a large number of TPMs). If the CA reneges on an agreement not to map endorsement keys to identities, or has permission to do such mapping but the CA's database is compromised, the identities of all TPMs which have been certified by that CA will probably also have been compromised.

Two different schemes, and associated architectures, will now be described which address this difficulty. The first scheme sets out how a particular construction of the certificate given to a trusted platform module can allow the trusted platform to prove directly to a verifier (such as a remote service provider) that it possesses a certificate which has been validly formed by a trusted manufacturer without revealing the secret itself, and goes on to discuss a system architecture in which revocation can be satisfactorily carried out. The second scheme, which can as broadly described be considered a general scheme of which the first scheme is also an example (though a specific version of the second scheme, using a different specific algorithm to the first scheme, is also described), is a group signature scheme adapted to provide evidence for use in revocation.

First Scheme

Figure 7:
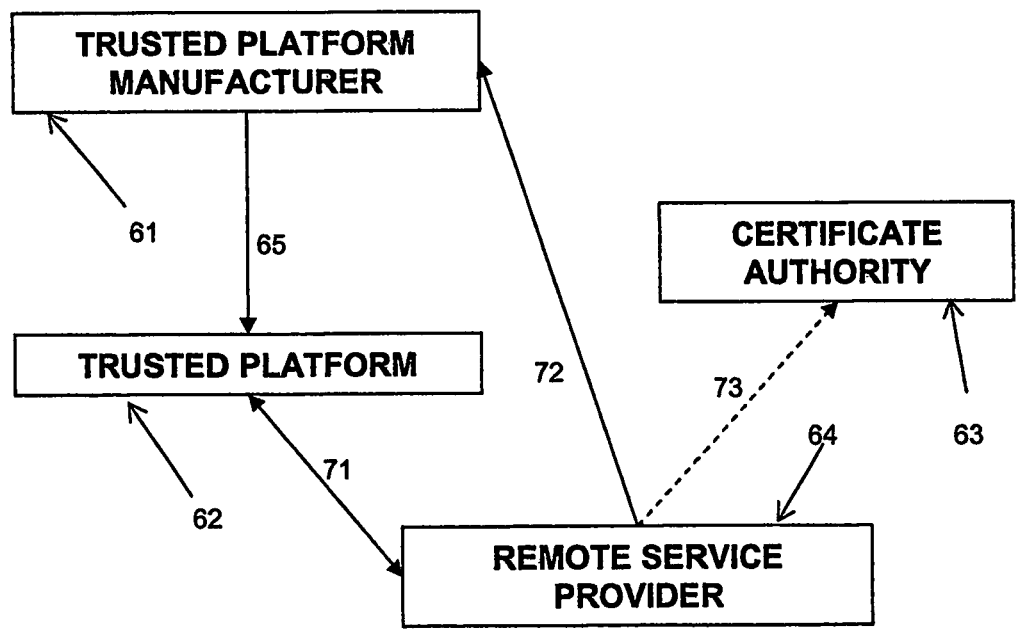
FIG. 7 shows schematically trust relationships employed in trusted computing technology according to embodiments of the present invention.

In aspects of the invention, the approach taken to solve this problem is to find a mechanism that will allow the TPM itself to convince a verifier, who may be an RSP, a certificate authority, or a revocation agency, that it has a trusted manufacturer's certificate, but in such a way that the verifier will not be able to distinguish a particular TPM. The TPM is therefore able to provide direct proof that it is a legitimate TPM, rather than simply gives its endorsement key to the CA and then an RSA will have indirect proof (by reference to a CA). The relationships involved are shown in FIG. 7 (with reference numerals as for FIG. 6 where the same element is referred to). The trusted platform manufacturer 61 provides the TPM 62 with a unique identity and certifies this identity (step 65), though as will be seen below, this certification takes a new form. It is therefore possible in such an arrangement for no CA 63 to be required to take a role in certifying this manufacturer's certificate (though, as will be seen below in respect of revocation, there may still be a role for CAs in allowing RSPs to determine whether TPM credentials have been revoked—this is represented by dashed line 73 here). Instead, when a verifier 64 needs to establish that a TPM is a legitimate product of a trusted manufacturer, there is an interaction 71 in which the TPM does not reveal its unique identity to the verifier, but does indicate (to an appropriate standard) that it is extremely improbable that its certificate could have been formed in any way other than the proper manner by the trusted manufacturer. As will be discussed further below, this interaction 71 can be an iterative interaction between the verifier 64 and the TPM 62 (such an interactive proof with a prover and a verifier, where the prover convinces the verifier of a statement without revealing any information about how to go about proving that statement, is known as a zero-knowledge proof), or can be achieved (with clear advantages in communication efficiency at the expense of some computational burden to the TPM) by provision of a signed mathematical structure to the verifier by the TPM for evaluation by the verifier. In either event, the verifier uses public data from the trusted platform manufacturer to determine that the certificate must have been formed in the proper manner by the trusted platform manufacturer.

A direct proof scheme according to an aspect of the invention will now be described. This scheme will be described in two versions: one version is a zero-knowledge proof requiring iterative interaction between TPM and verifier, and the other version involves anonymous signature of a mathematical structure by the TPM, with the verifier then able to determine that the certificate of the TPM is validly formed by resolution of the mathematical structure. In both cases, certification by the manufacturer uses the condition $c=(t_1 m^{e_2}+t_2)^{d_1}$ mod n, where m is a TPM's identity and $(e_1, e_2, n, t_1, t_2)$ are public parameters of a TPM manufacturer. Of these private components, n is a RSA modulus, $e_1$ and $e_2$ are RSA exponents, and $t_1$ and $t_2$ are randomly chosen integers. $d_1$ is a private parameter derived from $e_1$. This condition can be proved in zero-knowledge by $(\log e_1)+(\log e_2)$ rounds. Since neither $e_1$ nor $e_2$ is a security parameter, both can be chosen to lie within a reasonably small range (in the current version of TCG specification, $e=2^{16}+1$ and n has 2048-bit size). The security of this scheme is based on the assumption (proposed by J. Camenisch and M. Stadler, "Efficient group signature schemes for large groups", *Advances in Cryptology—CRYPTO '97*, LNCS 1294, pp. 410-424, Springer-Verlag, 1997) that if n is an RSA modulus with unknown factorization; there exist two integers $t_1$ and $t_2$ in $G^*_n$ and two small integers $e_1$ and $e_2$ in $G^*_{\phi(n)}$ such that it is hard to compute values m and c such that $c^{e_1}=(t_1 m^{e_2}+t_2)$ mod n. In order to forge a valid pair (m, c) with $c^{e_1}=t_1 m^{e_2}+t_2$ mod n, an attacker might start by (a) choosing c and then computing $m=((c^{e_1}-t_2)/t_1)^{d_2}$ mod it; or (b) choosing m and then computing $c=(t_1 m^{e_2}+t_2)^{d_1}$ mod n. In either case, the attacker has to solve the RSA problem, so forgery of a valid pair can be considered to be hard.

Where terms are not specifically identified in this application, this is generally because they are in general use in cryptography and will be readily understood by a person skilled in this art. Alternatively, the reader is directed to an appropriate cryptography primer (such as that provided in the text and references of RSA Laboratories' Frequently Asked Questions About Today's Cryptography, found at http://www.rsasecurity.com/rsalabs/faq/index.html).

Each scheme employs as a fundamental building block a technical primitive used to verify that $(h, x=h^u, y=h^v, z=h^{uv})$ is a Diffie-Hellman (DH) tuple and that a prover knows a secret v. Different technical primitives are used for the zero-knowledge proof and the signature version. Both primitives use the same inputs, as follows:

Public Inputs:
n—RSA modulus, H—a hash function with output size close to |n|
K—a smallest number to satisfy P=Kn+1 (prime).
$a \in Z_n^*(a \approx 1)$, $h = a^K \bmod P$
$x = h^u \bmod P$, $y = h^v \bmod P$, $z = h^{uv} \bmod P$
Private input (of the Prover): v The primitive for the interactive scheme is here termed DH-interaction(h, x, y, z). It comprises the following steps:
1. Verifier chooses at random $1 < a < n$, $1 < b < n$ and sends to Prover $C = h^a x^b \bmod P$.
2. Prover sends to Verifier $R = H(C^v \bmod P)$.
3. Verifier accepts if R ?=$H(y^a z^b \bmod P)$ or rejects otherwise.

This primitive is obviously simulatable (a property of a zero-knowledge proof is that it can be simulated accurately without providing information concerning the secret to any third party), because anybody without knowing v can compute $C = h^a x^b \bmod P$ and $R = H(y^a z^b \bmod P)$. This simulation has identical distribution as that from a real proof.

The primitive for the signature scheme is here termed DH-signature(h, x, y, z). This works between Prover and Verifier as follows:
1. Signer chooses at random $1 < b < n$ and then computes $$f = h^b \bmod P, g = x^b \bmod P$$

$$w = H(x, y, z, f, g)$$

$$s = b - v^* w \bmod n$$

The signer sends Verifier (w, s) as a signature on the DH tuple (x, y, z).
2. To verify the signature, Verifier computes $$f' = h^s y^w \bmod P,$$

$$g' = x^s z^w \bmod P,$$

$$w' = H(x, y, z, f', g').$$

Verifier accepts if the check w'?=w succeeds, and rejects otherwise.

DH-signature(h, x, y, z) is a Schnorr based signature (see C. P. Schnorr, "Efficient identification and signatures for smart cards", *Advances in Cryptology-Crypto* '89, LNCS 435, pp. 239-252, Springer-Verlag, 1990) signing a DH tuple (x, y, z) under a key (v, h, x, y, z, n, P) where v is a private parameter and (h, x, y, z, n, P) are public parameters.

The use of these primitives to provide direct proof schemes suitable for the trust relationships set out in FIG. 7 will now be discussed. The trustworthy manufacturer of trusted platform modules (hereafter TPM manufacturer) needs the following to be able to certify TPMs that it produces: one RSA modulus n, two public parameters $e_1$ and $e_2$, and one private parameter $d_1$ computed such that $e_1 * d_1 = 1 \bmod \phi n$). A value K is chosen such that P=Kn+1 is prime. It is desirable that n is slightly smaller than 2048 bits, K is a smallest value to make P prime, and that P is about 2048 bits. $t_1$ and $t_2$ are randomly chosen in $G^*_n$ so that their $e_1$th-root or $e_2$th-root are hard to compute.

The TPM manufacturer then certifies a TPM it produces as follows: firstly the identity in is chosen such that $1 < m < n$, and after this the TPM manufacturer certifies m by computing $c = (t_1 m^{e_2} + t_2)^{d_1} \bmod n$. m and c are then stored on the TPM. Optionally, it is possible to use Chaum's RSA blind signature scheme (see D. Chaum, "Blind signatures for untraceable payments", *Advances in Cryptology—Crypto* '82, Springer-Verlag (1983), 199-203) so that the TPM manufacturer will not know the values of m or c.

The direct proof scheme described here is designed to achieve the following goal: at the end of the scheme run,
1. a verifier is convinced that a claimed TPM knows in and c where $c = (t_1 m^{e_2} + t_2)^{d_1} \bmod n$.
2. the verifier doesn't know m or c.

To convince the verifier of 1) above, TPM sends the verifier $x = h^{m^{e_2}} \bmod P$ and $y = h^{c^{e_1}} \bmod P$ and then convince the verifier of the structure of x and y, where $(h, e_1, e_2)$ are public input and (m, c) are private input from TPM. After that, the verifier accepts 1) if $y = x^{t_1} * h^{t_2} \bmod P$ and reject 1) otherwise.

A general case protocol for obtaining such a proof of the structure of x and y follows below. This protocol applies to both zero-knowledge and anonymous signature versions, with the differences between the application of the protocol in the two versions being indicated. The zero-knowledge version derives in part from our earlier British Patent Application No. 0104140.9, filed on 20 Feb. 2001, whereas the signature version derives in part from the Schnorr signature scheme (see C. P. Schnorr, "Efficient identification and signatures for smart cards", *Advances in Cryptology—Crypto* '89, LNCS 435, pp. 239-252, Springer-Verlag, 1990). In the zero-knowledge version, DH-interaction will be used in the protocol and in the signature version DH-signature will be used instead.

The protocol applies generally to any e rather than specifically to $e_1$ and $e_2$, so e is used instead of $e_1$ or $e_2$, and $h^\alpha = h^{\beta^e} \bmod n$ is used instead of $x = h^{m^{e_2}} \bmod P$ or $y = h^{c^{e_1}} \bmod P$. The specified protocol is thus suitable for proving both x and y.

Protocol ($h^\alpha = h^{\beta^e} \bmod n$):
Prover convinces Verifier that the public inputs (e, n, P, h, λ, δ(e)) satisfy $\delta(e) = h^{\beta^e} \bmod P$ and $\lambda = h^\beta \bmod P$ and that Prover knows α and β.

In this protocol, $\delta(\gamma) = h^{\beta^1} \bmod P$. The protocol will abort if any check in either DH-interaction or DH-signature does not succeed.

Prover and Verifier run the following protocol by starting from γ=e.

--- while γ > 1 do
{
  1. Prover performs the following steps:
     x ← δ(⌊γ/2⌋),
     if t is even: y ← δ(γ) , sends x to Verifier,
     if t is odd:   y ← δ(γ−1) , sends x and y to Verifier.
  2. if t is even: both run DH-interaction(h, x, x, δ(γ))
     or DH-signature(h, x, x, δ(γ)).
     if t is odd: both run DH-interaction(h, x, x, y) or DH-
     signature(h, x, x, y) and DH-interaction(h, y, λ, δ(γ)
     or DH-signature(h, y, λ, δ(γ)).
  3. Both perform γ ← ⌊γ/2⌋ and then (δ(γ) ← x).
}

--- when γ=1, both run DH-interaction(h, h, δ(1), λ) or DH-signature(h, h, δ(1), λ). Verifier accepts if all of the above process succeed or rejects otherwise.

After running the above protocol twice: one with ($e_1$, $\alpha_1 = c^{e_1} \bmod n$, $\beta_1 = c \bmod n$), and the other with ($e_2$, $\alpha_2 = m^{e_2}$ mod n, $\beta_2 = m \mod n$), Verifier accepts the structure of $(c^{e_1} = t_1 m^{e_2} + t_2 \mod n)$ if $\delta(e_1)$ (namely y) from the first run and $\delta(e_2)$ (namely x) from the second run satisfy $\delta(e_1) = \delta(e_2)^{t_1} * h^{t_2}$.

One fundamental difference between the zero-knowledge and the signature versions is that different primitives are used (as discussed above). The other fundamental difference is that the interactive version involves in some sense a synchronous working through of the protocol (there is a stream of interactions between prover and verifier in working through the protocol) but the signature version is essentially asynchronous (the prover works through the protocol to produce a mathematical structure, signs this mathematical structure, and provides it to the verifier, who checks the signature and works through the mathematical structure to obtain verification).

For the zero-knowledge scheme, each DH-interaction needs 3 modulo exponentiations—he TPM computes one and the verifier computes two. The whole interactive proof will cost about $2.5 * ((\log e_1) + (\log e_2))$ modulo exponentiations—the TPM computes about $2.5 * ((\log e_1) + (\log e_2))$ and the verifier computes about $3 * ((\log e_1) + (\log e_2))$. The communication rounds are $(\log e_1) + (\log e_2)$. If choosing $|e_1| = |e_2| = 16$, TPM will need to compute 72 modulo exponentiations, and to communicate with the verifier in 32 rounds.

For the signature scheme, each DH-signature needs 6 modulo exponentiations—the TPM computes two and the verifier computes four. Signing a signature will cost about $4 * ((\log e_1) + (\log e_2))$ modulo exponentiations, and verifying a signature will cost about $6 * ((\log e_1) + (\log e_2))$. The communication cost is now only that of a single message with about $2.5 * ((\log e_1) + (\log e_2)) * (\log P)$ bits.

A specific case of the signature scheme will now be described—this case is chosen to be particularly suitable for modification of existing trusted platform technology. Here we shall choose $e_1 = 2^{16} + 1$ and $e_2 = 2$.

TPM first creates h, x and y by randomly choosing a GER $\alpha \in_R (1, n-1)$, and computing $h = \alpha^K \mod P$, $x = h^{m^2} \mod P$ and $y = x^{t_1} * h^{t_2} \mod P$. TPM makes h, x, and y available so that these can be obtained by an the verifier.

TPM makes two signatures respectively on x and y as follows.

1. Signature ($x = h^{m^2} \mod n$):

TPM chooses at random $1 < b < n$ and then computes $z = h^m \mod n$ $f = h^b \mod P, g = z^b \mod P$ $u = H(z, x, f, g)$ $s = b - m * u \mod n$ TPM chips (z, u, s) as a signature on the structure of $x = h^{m^2} \mod n$.

To verify this signature, the verifier computes $f' = h^s * z^u \mod P$ $g' = z^s * x^u \mod P$ $u' = H(z, x, f', g')$ the verifier accepts ($x = h^{m^2} \mod P$) if the check $u'? = u$ succeeds, and rejects this otherwise.

2. Signature ($y = h^{c^{2^{16}+1}} \mod n$):

The TPM computes $r_i = c^{2^i} \mod n$, $(0 \leq i \leq 16)$—these values can be used as long-term secrets of the TPM. The TPM needs to store such secrets securely, for example, only storing an encrypted version of them outside of the TPM.

To do signing, the TPM randomly chooses $b_i \in_R (1, n-1]$ $(0 \leq i \leq 15)$ and computes $h_i = h^{r_i} \mod P (0 \leq i \leq 16)$ $f_i = h^{b_i} \mod P (0 \leq i \leq 15)$ $g_i = h_i^{b_i} \mod P (0 \leq i \leq 15)$ $g_{16} = h_{16}^{b_0} \mod P$ $v = H(h, k, h_0, h_1, \ldots, h_{16}, f_0, f_1, \ldots, f_{15}, g_0, g_1, \ldots, g_{16})$ $s_i = b_i - r_i * v \mod n (0 \leq i \leq 15)$ The TPM chips the following data as the signature on the structure of $y = h^{c^{2^{16}+1}} \mod n$:

$h_i (0 \leq i \leq 16), v, s_i (0 \leq i \leq 15)$

To verify this signature, the verifier computes $f'_i = h^{s_i} * h_i^v \mod P (0 \leq i \leq 15)$ $g'_i = h_i^{s_i} * h_{i+1}^v \mod P (0 \leq i \leq 15)$ $g'_{16} = h_{16}^{s_0} * y^v \mod p$ $v' = H(h, k, h_0, h_1, \ldots, h_{16}, f'_0, f'_1, \ldots, h_{15}, g'_0, g'_1, \ldots, g'_{16})$ and then checks $v'? = v$.

On the basis of these signature verifications, the verifier is convinced of the following.

(1) From DH-signature, the verifier is convinced of $c \in (1, n-1], h_0 = h^c \mod P, h_1 = h^{c^2} \mod P$ by checking $f'_0$ and $g'_0$ in v.

$f'_0 = h^{s_0} * h_0^v \mod P$ $g'_0 = h_0^{s_0} * h_1^v \mod P$ (2) From DH-signature and (1), the verifier is convinced of $c^{2^i} \in (1, n-1], h_i = h^{c^{2^i}} \mod P, h_{i+1} = h^{c^{2^i} * c^{2^i}} \mod P$ by checking $f'_i$ and $g'_i$ in v.

$f'_i = h^{s_i} * h_i^v \mod P$ $g'_i = h_i^{s_i} * h_{i+1}^v \mod P$ (3) From DH-signature and (1), the verifier is convinced of $c \in (1, n-1], h_0 = h^c \mod P, y = h_{16}^c \mod P$ by checking $f'_0$ and $g'_{16}$ in v.

$f'_0 = h^{s_0} * h_0^v \mod P$ $g'_{16} = h_{16}^{s_0} * y^v \mod P$

From (1), (2) and (3), the verifier is convinced of $y = h^{(\ldots (c)^2 \ldots)^2 * c} \mod P$ $= h^{c^{2^{16}} * c} \mod P$ $= h^{c^{2^{16}+1}} \mod P$ After having two succeeded verifications on Signature ($x = h^{m^2} \mod P$) and Signature($y = h^{c^{2^{16}+1}} \mod n$) respectively, the verifier as Verifier can therefore accept the construct of $(c^{2^{16}+1} = t_1 m^2 + t_2 \mod n)$ if $y = x^{t_1} * h^{t_2} \mod P$. The TPM has therefore directly proved to the verifier that it has a secret m with a certification c where $c=(t_1 m^{e_2}+t_2)^{d_1}$ mod n, and has done so without revealing the values of either m or c.

A particularly appropriate way to implement a hash function H with output size close to 2048-bit is to use the well-known hashing algorithm SHA-1 (because SHA-1 is currently already used in a conventional TPM) 12 times with concatenated results, i.e., H(x)=SHA-1(x+1)∥SHA-1(x+2)∥ . . . ∥SHA-1(x+12), where ∥ is concatenation.

In this special case of the direct proof scheme according to an aspect of the invention: $e_1=2^{16}+1$, $e_2=2$, and |P|=2048. In order to sign the construct of $c=(t_1 m^{e_2}+t_2)^{d_1}$ mod n, a TPM needs to 1. generate 18 random numbers with 2048-bit size,
2. compute 55 RSA modulo exponentiations in which 54 have 2048-bit length modulus and exponent; and one has 2048-bit modulus and (log K)-bit exponent,
3. compute 17 multiplication modulo, 17 subtraction modulo and 1 division modulo with 2048-bit modulus,
4. compute 2 hash-functions, equivalent to 24 SHA-1 functions, and
5. send a signature with the size of 21*(log P)+19*(log n) bits, approximately 80k-bit in size.

An exemplary conventional TPM includes a crypto accelerator capable of computing a 2048-bit RSA signature in 500 ms. To signing the structure of $c=(t_1 m^{e_2}+t_2)^{d_1}$ mod n once, the TPM will need to compute 55 RSA modulo exponentiations, which would take about half minute—however, this can be precomputed, and so will not provide an unacceptable overhead for TPM-verifier interaction.

While using such direct proof schemes to prove a IPM's identity to an RSP has the clear advantage of removing the Certificate Authority from being a point of weakness in the overall system, there is a potential accompanying disadvantage. This disadvantage is that it is not straightforward to revoke the certification on a TPM's secret (which in the prior art could straightforwardly be done by the CA—which would merely have to revoke the certificate that it had granted). A TPM can convince an RSP that it has a trusted manufacturer's certificate, but does not allow the RSP to distinguish a specific TPM. Each RSP can construct its own blacklist of rogue TPMs (as the direct proof scheme allows the RSP to distinguish one TPM it has interacted with from other TPMs it has interacted with, as is discussed further below), but it cannot transfer such information as it knows about the TPM usefully to another RSP (or any other party)—there is no way to match up the RSP's own blacklist with any other blacklist, because the RSP does not learn the identity of the TPM and has no associated transferable data. If an attacker obtains one identity, for example, by physically breaking one TPM, he can convince those RSPs who haven't had a record of this identity in their own black list of the validation of the identity.

Use of a direct proof scheme, by definition, makes it impossible to create a globally distributed revocation list unless a rogue platform's secret primitives have been revealed to the legitimate community. Where trusted platforms are used, it is unlikely that this will occur—so it can be assumed that any given platform cannot learn directly from the bad experiences of other platforms. In a future world of advanced peer-to-peer architectures, therefore, even if a platform knew that there was an outbreak of a rogue TPMs, the platform couldn't be given a new "rogue definition" (similar to a new virus definition) to detect those rogues unless the extracted primitives had become known to the legitimate community. Thus an entire network might shutdown because of fears of broken trust. If the primitives have been created through a blind scheme (so that even the manufacturer doesn't even know them and cannot therefore impersonate any TPM), then this problem becomes even more serious.

This problem is fundamental to direct proof schemes because the purpose of a direct proof scheme is to prevent correlation of identities. If a direct proof scheme is effective, it's impossible for one party to give information to a second party that permits the second party to recognise that his correspondent is also the first party's correspondent. So if a TPM is broken, its secret primitives extracted and replicated into software simulations of TPMs, it's impossible to put that TPM onto a distribution list unless the extracted primitives become known to the legitimate community, as well as to the rogue community.

Accordingly, in a further aspect of the invention there is proposed an improved system architecture which allows for effective revocation even where the TPM is adapted to provide direct proof that it has a validly formed credential to an RSP without the TPM revealing its credential to the RSP and without requiring a revoking Certificate Agency to possess the endorsement identity of the TPM. This system is described with reference to the form of direct proof discussed above, but it should be appreciated that this architecture is generally applicable to any arrangement in which a TPM is adapted to provide direct proof that it has a validly formed credential to a verifier without the TPM revealing its credential to the verifier, and that where the specific direct proof used above is referred to below, such reference can be replaced with a reference to any other direct proof without going beyond the invention in this aspect.

The system involves four sets of entities, as shown in FIG. 7: TPM manufacturers 61, TPMs 62, Certificate Authorities (CAs) 63, who also play the role of revocation agency, and RSPs 64.

As described above, in order to implement the exemplary direct proof scheme, each TPM manufacturer has parameters: n, K, P, $e_2$, $e_2$, $d_1$, $t_1$ and $t_2$, where n, K, P, $e_2$, $e_2$, $t_1$ and $t_2$ are public parameters and $d_1$ is a private parameter. Each TPM has secret parameters m and c satisfying $c=(t_1 m^{e_2}+t_2)^{d_1}$ mod n. Different parameters may be used by the TPM manufacturer and the TPM if a different direct proof scheme is employed.

In this arrangement, each CA has a traditional asymmetric key pair, $P_{CA}$ and $S_{CA}$. Each CA also has a number of public identities, $ID_{CA}$, which could be the CA's public name, $n_{CA}$, concatenating with an identity of a specific purpose, $P_A$, i.e., $ID_{CA}=n_{CA}\|P_A$. Each RSP has an authenticated version of $P_{CA}$.

In the scenario of interest, a trusted platform device (TPM) needs to communicate with a remote service provider (RSP) to access a purpose (here, a group of specified services) $P_A$, and a certificate authority (CA) is trusted by the RSP to issue a certificate for $P_A$ and to maintain a black list of those TPMs which should not be allowed to access $P_A$. This is accomplished as follows.

The TPM first creates a traditional asymmetric key pair, $P_{TPM}$ and $S_{TPM}$ (e.g., an RSA key pair), and then signs the structure of $c=(t_1 m^{e_2}+t_2)^{d_1}$ mod n under the secret values of m and c. As described above, to do this the TPM randomly chooses h, computes x and y, where $x=h^{m^{e_2}}$ mod P and $y=h^{c^{e_1}}$ mod P, and makes two signatures: Signature($x=h^{m^{e_2}}$ mod n) and Signature($y=h^{c^{2^{16}+1}}$ mod n). TPM sends the signatures including x and y with $P_{TPM}$ to CA. After the verification of the signature succeeds, CA is convinced that the TPM has a pair (m, c) satisfying $c=(t_1 m^{e_2}+t_2)^{d_1}$ mod n, and the given h and x satisfy $x=h^{m^{e_2}}$ mod P. Note that this is simply a further use of the direct proof scheme described above for proof by TPM and verification by RSP—the only significant difference here is that the verification is by the CA. It also follows that any other effective direct proof scheme could be employed to carry out this step.

The CA then sends to the TPM $ID_{CA}$ (optionally, the TPM can simply access $ID_{CA}$ from a trusted public domain). The TPM computes $h_{CA}$ and x' such that $h_{CA}=H(ID_{CA})$ and $x'=h_{CA}^{m^{e2}}$ mod P. TPM computes DH-signature(h, $h_{CA}$, x, x') as described above and sends the signature to the CA. The CA first verifies DH-signature(h, $h_A$, x, x'). If the verification doesn't succeed, CA refuses the TPM's certificate request. Otherwise CA checks if x' is in a black list. If x' is in the black list, the CA also rejects this TPM. Otherwise CA certifies $P_{TPM}$ by using $P_{CA}$ and $S_{CA}$ in a usual way (as the same as the private CA in the current version of TCG specification) and records x' and the certificate of $P_{TPM}$. An appropriate way to manage this is for the CA to record x' with $P_{TPM}$ for internal access only and to list $P_{TPM}$ in a publicly accessible revocation list.

Again, it should be noted that an alternative direct proof scheme to that using DH-signature could be employed here without straying outside the scope of this aspect of the invention. All that is necessary is for the direct proof process to produce a value such as x' that is representative of a TPM secret without revealing that secret, in such a way that the CA can establish for itself a list of TPMs with certificates issued to those TPMs.

In the same way as in the current version of TCG specification, to access a service in the group of $P_A$ provided by RSP, the TPM authenticates itself to RSP with the certificate of $P_{TPM}$. RSP verifies the certificate and also checks whether this certificate is in CA's revocation list. For example this can be achieved by using a traditional Certificate Revocation List (CRL).

The CA will generally learn of rogue TPMs by receiving certificates $P_{TPM}$ which it has issued from RSPs (or other parties that have interacted with the rogue TPM) where these certificates have been used, for example to access a particular service, in such a way that it is apparent that the TPM identity is not, or should not be, valid. The CA is then able to match the certificate $P_{TPM}$ with the associated x' provided in the verification of the relevant TPM. The certificate $P_{TPM}$ can then be placed on the CRL. The rogue PTM will not be able to obtain a further certificate as the same value of x' will be generated during the verification process—as indicated above, the CA will detect this during verification and will refuse to provide a certificate to the rogue PTM.

Second Scheme

As indicated above, the second scheme is a group signature scheme with revocation evidence. As will be described below, a specific scheme described is a further developed version of that described by G. Ateniese, J. Camenisch, M. Joye, and G. Tsudik in "A practical and provably secure coalition-resistant group signature scheme" in *Advances in Cryptology— CRYPT* 2000, LNCS 1880, pp. 255-270, Springer-Verlag, 2000. In the scheme set out below each TPM has a unique endorsement key z and the corresponding key certificate (u, e) satisfying $u^e=a^z b$ mod in, where (a, b, n) are public parameters of a TPM manufacturer—n is a RSA modulus, and a and b are randomly chosen integers. The security of this scheme is based on the strong RSA assumption and decisional Diffie-Helhnan assumption. This group signature scheme is particularly efficient, and benefits from an existing security proof in a random oracle model in Ateniese et al (referenced above).

A general group signature scheme with revocation evidence generating properties will now be discussed. This general scheme comprises six procedures:

SETUP: On input of a security parameter 1, this probabilistic algorithm outputs the group public key PK (including all system parameters) and the group secret key SK for the group membership certificate issuer (CI).

JOIN: A protocol between CI and a user that results in the user becoming a new group member. The user's output is a membership secret and membership certificate.

REVOCATION EVIDENCE CREATE: A probabilistic algorithm that on input of a group public key, a membership secret, a membership certificate, and a revocation parameter, outputs revocation evidence.

SIGN: A probabilistic algorithm that on input of a group public key, a membership certificate, a membership secret, revocation evidence, and a message m, outputs a group signature of m with revocation evidence.

VERIFY: An algorithm for establishing the validity of an alleged group signature of a message with revocation evidence with respect to a group public key and a revocation parameter.

REVOCATION: An algorithm for listing revocation evidence from a group signature into a revocation list.

The following properties should, in a preferred scheme of this type, all be satisfied:

Correctness. Signatures produced by a group member using SIGN must be accepted by VERIFY.

Unforgeability. Only group members are able to sign messages on behalf of the group.

Anonymity. Given a valid signature of some message, identifying the actual group member is computationally hard for everyone including the group membership certificate issuer.

Linkability. Deciding whether two different valid signatures with different revocation evidence were computed by the same group member is computationally hard. However, deciding whether two different valid signatures were computed with the same revocation evidence is easy.

Traceability/Revocability. If a group member secret and its membership certificate are published, everyone is able to open a valid signature signed under this secret and certificate. Without the group member secret and membership certificate, none can trace a valid signature to the actual group member. However, anyone can trace any group signature to revocation evidence, therefore a group membership to a specified application purpose addressed by revocation evidence can be revoked.

Coalition-resistance. A colluding subset of group members (even if comprised of the entire group) cannot generate a valid signature that is signed under an extra group member secret and the corresponding valid membership certificate.

It is obvious that if any attacker gets one pair of the member secrets and membership certificates, he can make many "valid" copies. A group member's general signing ability cannot be revoked unless the group member secret and its membership certificate are published. However, although, group signatures with revocation evidence are group signatures without traceability of the membership certificate there is traceability of the membership with respect to revocation evidence. The revocation evidence for a particular use of a group signature (a signature by a group member for a particular purpose) is unique for a particular group member secret and membership certificate and purpose. Hence the link between revocation evidence and group signatures for a particular purpose is universally verifiable. We can therefore construct a revocation approach above and beyond that of the ordinary method of secret or certificate revocation.

The group signature scheme of Ateniese et al ("the ACJT signature scheme") will now be set out, before the modifications to achieve the present scheme are described.

A group manager (GM) has a public key $PK=(n, a, b, g, h, y, l, \Gamma, \Delta)$, where n is a product of two safe primes, p and q, a, b, g, h and y are quadratic residues modulo n, l is a security parameter, and $\Gamma$ and $\Delta$ are two intervals. GM has the corresponding private key $SK=(p, q, x)$, where p and q are used to issue group membership certificates, and $x=\log_g y$ is used for membership revocation.

A group member $P_i$ has a membership secret $z_i$ and a membership certificate $(u_i, e_i)$ satisfying $u_i^{e_i} = a^{z_i} b \bmod n$. The value $z_i$ is selected jointly by $P_i$ and GM from an appropriate integer range, $\Delta$. It is selected in a secure manner that ensures: (1) GM obtains no information about this value and (2) both $P_i$ and GM can verify that each other must make their contribution correctly. The values $e_i$ is a prime number selected by GM from another appropriate range, $\Gamma$. GM keeps a record of $(u_i, e_i)$ to identify $P_i$.

When $P_i$ signs a message on behalf of the group, $P_i$ proves membership in the group. To do this, he effectively proves the knowledge of $(z_i, u_i, e_i)$. For instance, to sign a message m on behalf of the group, $P_i$ first chooses $w \in_R \{0, 1\}^{2l}$, and computes $T_1 = u_i y^w \bmod n$, $T_2 = g^w \bmod n$, and $T_3 = g^{e_i} h^w \bmod n$. $P_i$ then creates a signature of the knowledge of integers $\alpha, \beta, \chi, \delta$ such that $b = T_1^\alpha \alpha^{-\beta} \gamma^{-\chi} \bmod n$, $1 = T_2^\alpha g^{-\chi} \bmod n$, $T_2 = g^\delta \bmod n$, and $T_3 = g^\alpha h^\delta \bmod n$ hold, where $\alpha \in \Gamma$ and $\beta \in \Delta$, on the message m. By using the notation introduced by Camenisch and Stadler in [CS97], this signature can be denoted as $$PK[(\alpha,\beta,\chi,\delta):b=T_1^\alpha \alpha^{-\beta}\gamma^{-\chi} \wedge 1=T_2^\alpha g^{-\chi} \wedge T_2=$$
$$g^\delta \wedge T_3=g^\alpha h^\delta \wedge \alpha\in\Gamma \wedge \beta\in\Delta](m).$$

By verifying this signature, the verifier is convinced that $$\alpha^\beta b = T_1^\alpha y^{-\chi} = T_1^{\alpha p i} y^{-\alpha\delta} = (T_1 y^{-\delta})^\alpha \bmod n,$$

and further $$u_i^{e_1} = a^{z_1} b \bmod n \text{ with } z_i=\beta \bmod n, u_i = T_1 y^{-\delta} \bmod n, e_i=\alpha \bmod n.$$

This group signature can be regarded as a signature of knowledge of (1) a value $z_i \in \Delta$ such that $a^{z_i}b$ is the value which has an $e_i$-th root, and of (2) the $e_i$-th root of $a^{z_i}b$ such that it is ElGamal-encrypted in $(T_1, T_2)$ under y, where $e_i$ is the first part of the representation of $T_3$ w.r.t. g and h and that $e_i$ lies in $\Gamma$.

As with all group signature schemes, GM and only GM can assert the signature to $P_i$ because GM has the ElGamal-decryption key, x, and GM can therefore compute the value $u' = T_1(T_2)^x = u_i$ that identifies $P_i$.

Figure 8:
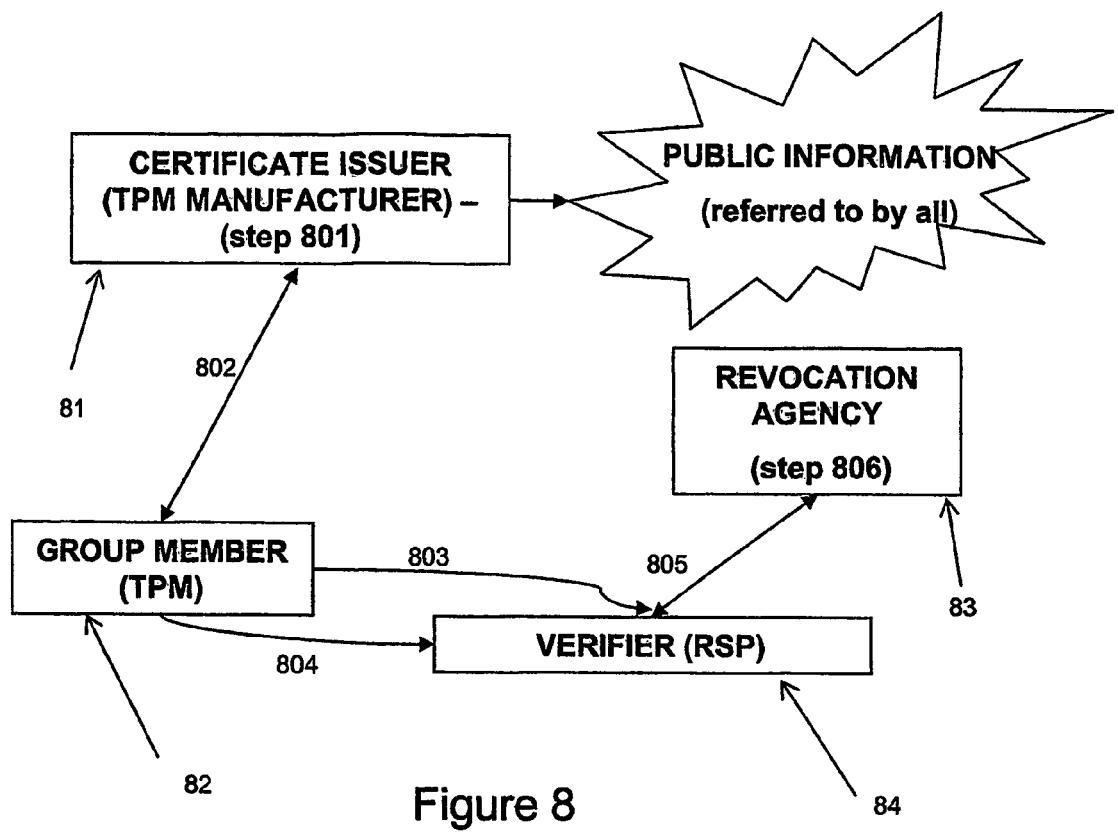
FIG. 8 shows schematically parties involved in a trusted computing technology architecture in accordance with embodiments of the present invention together with interactions between these parties according to a group signature scheme.
Figure 9:
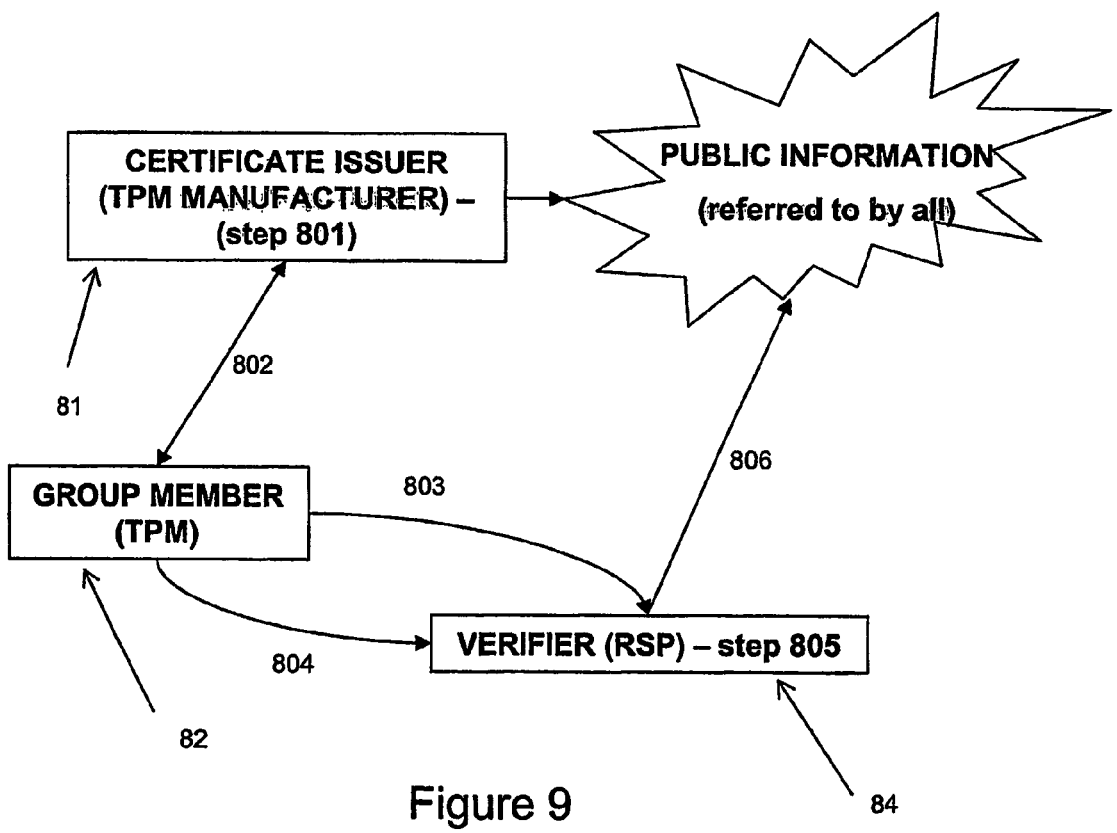
FIG. 9 shows a modification to the arrangement of FIG. 8 which does not employ a revocation agency.

Modifications to this scheme to provide a group signature scheme with revocation evidence will now be described. The parties involved, and the processes, are illustrated schematically in FIG. 8 (for a version employing a revocation agency) and FIG. 9 (for a version not employing a revocation agency). This new scheme makes the following three changes to the ACJT group signature scheme:

1. We do not allow any entity except for the TPM 82 itself to retrieve the endorsement key certificate from a signature, otherwise this entity can break the anonymity. Therefore we omit GMs membership opening ability and keep only certificate issuing ability, and we call this entity an endorsement key certificate issuer (CI)—it is preferred that CI 81 will be a manufacturer of genuine TPMs.

2. For enable revocation of a group signature for a particular purpose, we require a group member 82 to create self-certified revocation evidence for that particular purpose, using for example, a revocation agency 83 that specialises in revocation for that particular purpose. This revocation agency 83 can correlate different signatures that are signed under the same TPM endorsement key and key certificate for the same application purpose. Alternatively, verifiers may maintain their own revocation lists if detectors of rogne TPMs make such information publicly (or otherwise appropriately) available.

3. We simplify the process of creating a TPM endorsement key and issuing its certificate. The ACJT group signatures are designed for those applications where GM and $P_i$ might not trust each other to execute the scheme properly. In this TCG application, this process happens during the manufacture of genuine TPMs, and it is natural for CI, the TPM manufacturer, to trust the TPMs made by them.

The verifier 84 may be any party that needs to establish the bona fides of a TPM—typically, this will be a remote service provider (RSP).

We now describe the scheme with the six procedures described generally above exemplified.

1. Setup (Step 801)

To initiate a system, the definers of the overall architecture perform as follows:

1. Choose $\epsilon > 1$, k, and l as security parameters such that the parameter $\epsilon$ can properly control the tightness of the statistical zero-knowledgeness and the parameter l meets the needs of security requirement of the size of the modulus to use.

2. Choose $\lambda_1, \lambda_2, \gamma_1$, and $\gamma_2$ as lengths satisfying $\lambda_1 > \epsilon(\lambda_2 + k) + 2$, $\lambda_2 > 4l$, and $\gamma_1 > \epsilon(\gamma_2 + k) + 2$, $\gamma_2 > \lambda_1 + 2$. Define the integral ranges $\Delta = ]2^{\lambda_1} - 2^{\lambda_2}, 2^{\lambda_1} + 2^{\lambda_2}[$ and $\Gamma = ]2^{\gamma_1} - 2^{\gamma_2}, 2^{\gamma_1} + 2^{\gamma_2}[$.

3. Choose a collision-resistant hash function $H: \{0,1\}^* \to \{0,1\}^k$.

To set up a TPM manufacturer (called CI), CI creates its public key (n, a, b, g, y, h) and the corresponding private key (p', q') by performing as follows:

1. Select random secret l-bit primes p', q' such that $p = 2p' + 1$ and $q = 2q' + 1$ are prime. Set the modulus $n = pq$.

2. Select random elements a', b', $C' \in_R Z_n^*$, compute $g' = H(c'\|1)$, $y' = H(c'\|2)$, and $h' = H(c'\|3)$, check if $\gcd(a' \pm 1, n) = 1$, $\gcd(b' \pm 1, n) = 1$, $\gcd(g' \pm 1, n) = 1$, $\gcd(y' \pm 1, it) = 1$ and $\gcd(h' \pm 1, n) = 1$ hold, if check succeeds, compute $a = a'^2 \bmod n$, $b = b'^2 \bmod n$, $g = g'^2 \bmod n$, $y = y'^2 \bmod n$, and $h = h'^2 \bmod n$, otherwise report to CI "Sorry, I have factorised your modulus". This will guarantee a, b, g, y, $h \in QR(n)$ of order p'q', and will also ensure that no one knows the discrete logarithm of y (h or g) w.r.t. base g or h (g or y, or h or y), all modulo n.

CI's public key is made available via the usual means (i.e., embedded in some form of a public key certificate signed by a trusted authority). In practice, to prevent framing attacks, before certifying this public key, the trusted authority must verify components of (n, a, b, g, y, h). In particular, (1) CI needs to provide a proof to the trusted authority that n is the product of two safe primes, and (2) CI sends a', b', and c' to the trusted authority who then checks that $\gcd(a' \pm 1, n) = 1$, $\gcd(b' \pm 1, n) = 1$, $\gcd(H(c'\|1) \pm 1, n) = 1$, $\gcd(H(c'\|2) \pm 1, n) = 1$ and $\gcd(H(c'\pm 3) \pm 1, n) = 1$ hold, and computes $a = a'^2 \bmod n$, $b = b'^2 \bmod n$, $g = H(c'\|1)^2 \bmod n$, $y = H(c'\|2)^2 \bmod n$, and $h = H(c'\|3)^2 \bmod n$.

2. Join (Step 802)

To let a TPM (called TPM) become a member of the TPM group, there are a number of possible approaches that can be followed. In one exemplary form, TPM and CI may perform as follows:

1. TPM generates a secret exponent z (R a as its endorsement key, computes $v = a^z \bmod n$, and sends v to CI.

2. CI issues the endorsement key certificate (u, e) by selecting a random prime $e \in_R \Gamma$ and computing $u = (vb)^{1/e} \bmod n$. CI stores (u, e) on TPM.

It should be noted that there are many possible alternative forms of the joining process, particularly in the division of tasks between CI and TPM. The following three versions are exemplary:

Version 1.

1. CI randomly chooses an exponent $z \in_R ]1, 2^{l_2}]$ as TPM's endorsement private key, and computes $v = a^z$.

2. CI generates the endorsement key certificate (u, e) by selecting a random prime $e \in_R [2^{l_3}+1, 2^{l_3}+2^{l_2}]$ and computing $u = (vb)^{1/e}$.

3. CI stores (z, u, e) on TPM.
4. CI erases all of its knowledge of (z, u, e).

Version 2.

1. TPM generates a secret exponent $z \in_R ]1, 2^{l_2}]$ as its endorsement private key, computes $v=a^z$, and sends v to CI.
2. CI issues the endorsement key certificate (u, e) by selecting a random prime $e \in_R [2^{l_3}+1, 2^{l_3}+2^{l_2}]$ and computing $u=(vb)^{1/e}$.
3. CI stores (u, e) on TPM.
4. CI erases all of its knowledge of (u, e).

Version 3.

1. TPM generates a secret exponent $z \in_R ]1, 2^{l_2}]$ as its endorsement private key.
2. TPM computes $v=a^z$.
3. TPM selects a random prime $e \in_R [2^{l_3}+1, 2^{l_3}+2^{l_2}]$.
4. TPM imports temporary secret p', q'), and computes $d=1/e \bmod 4p'q'$.
5. TPM computes $u=(vb)^d$.
TPM erases all of its knowledge of (D', q').

Note that in this join process, we assume:
Communication between TPM and CI is secure, i.e., private and authentic;
CI trusts that TPM selects the secret z correctly. Otherwise CI and TPM have to run the JOIN protocol described in Ateniese et al (see above), where z is selected jointly by TPM and CI.
TPM also trusts that CI computes the certificate correctly. Otherwise TPM will verify if $u^e=a^z b \bmod n$ after received (u, e).

3. Revocation Evidence Create (Step 803)

This will be described in respect of a model which employs a revocation agency. However, it may be noted that using this approach, any correspondent may act as a revocation agency and it is therefore possible for each verifier to maintain their own revocation lists. For this to be done effectively, when verifiers (or other parties interested in the desirability of effective operation of the system as a whole) become aware of details that should be added to their revocation list, they make these available to other potential verifiers. Assume that each revocation agency has a unique name, RevocationAgencyNane, which can be generated with an application's purpose identity, attribute, revocation agency's information, and some randomness (it can be noted that this type of name can be generated without a revocation agency information, but merely information identifying what kind of revocation information it is—therefore allowing it to be employed in a model without explicit revocation agencies). The revocation evidence w.r.t. this name is created by performing as follows—two alternative versions are given below:

Version 1

1. Input CI's public modulus n, TPM's endorsement private key, z, and RevocationAgencyName.
2. Compute f'=H(RevocationAgencyName), and check if gcd(f'±1, n)=1 holds, if check succeeds, compute $f=f'^2$, otherwise report to CI "Sorry, I have factorised your modulus".
2'. Alternatively, if TPM happens to generate f given RevocationAgencyName, TPM simply computes $f=H(RevocationAgencyName)^2$. The probability that gcd(f'±1, n)≈1 is negligible.
3. Compute revocation evidence $E=f^z$.
4. Output (f, E).

Version 2

1. Input CI's public parameter a and modulus n, and RevocationAgencyName. Also input TPM's endorsement private key, z.
2. Compute f=H(RevocationAgencyName), and check if gcd(f'±1, n)=1 holds, if check succeeds, compute $f=f'^2 \bmod n$, otherwise report to CI "Sorry, I have factorised your modulus".
2'. Alternatively, if TPM happens to generate f given RevocationAgencyName, IPM simply computes $f=H(RevocationAgencyName)^2 \bmod n$. The probability that gcd(f'±1)≈1 is negligible.
3. Compute revocation evidence $C=(af)^z \bmod n$.
4. Output (f, C).

Note that based on the discrete logarithm assumption, it is assumed that no one knows the discrete logarithm of f to the base g or y or h, and the discrete logarithm of g or y or h to the base f, all modulo n.

4. Sign (Step 804)

To prove knowledge of the endorsement key z and the endorsement key certificate (u, e), TPM generates a group signature with revocation evidence on a generic message m $E \in \{0, 1\}^*$ by performing as follows:

1. Randomly choose $w \in_R \{0, 1\}^{2l}$.
2. Compute $T_1=uy^w \bmod n$, $T_2=g^w \bmod n$, and $T_3=g^e h^w \bmod n$.
3. Randomly choose $r_1 \in_R \pm\{0, 1\}^{\epsilon(\gamma 2+k)}$, $r_2 \in_R \pm\{0, 1\}^{\epsilon(\lambda 2+k)}$, $r_3 \in_R \pm\{0, 1\}^{\epsilon(\gamma 1+2l+k+l)}$, and $r_4 \in_R \pm\{0, 1\}^{\epsilon(2l+k)}$.
4. Compute $d_1=T_1^{r_1}/(a^{r_2}y^{r_3}) \bmod n$, $d_2=T_2^{r_1}/g^{r_3} \bmod n$, $d_3=g^{r_4} \bmod n$, $d_4=g^{r_1}h^{r_4} \bmod n$, and $d_5=(af)^{r_2} \bmod n$.
5. Compute $c=H(g\|h\|y\|a\|b\|T_1\|T_2\|T_3\|C\|d_1\|d_2\|d_3\|d_4\|d_5\|m)$.
6. Compute $s_1=r_1-c(e-2^{\gamma 1})$, $s_2=r_2-c(z-2^{\lambda 1})$, $s_3=r_3-cew$, and $s_4=r_4-cw$ (all in Z).
7. Output (c, $s_1$, $s_2$, $s_3$, $s_4$, $T_1$, $T_2$, $T_3$, C).

This is a Schnorr-like signature as used in the first scheme, and again as for the first scheme the signature can be largely pre-computed to minimise the work that is required when on-line. In this scheme, signature generation requires 7 (or 11) modulo exponentiations, and we note that only one of them cannot be pre-computed. Therefore just computation of c, $s_1$, $s_2$, $s_3$, $s_4$, and $d_4$ are done on-line (after discovery of m and E).

For a conventional challenge/response protocol with minimal on-line computation, we let TPM prepare items 1)-4) above, except for computing $d_4$ in 4), before going on-line. Later, when communicating with a challenger (namely a verifier), the challenger sends information about a revocation agency, RevocationAgencyName, and a fresh message, m, as a challenge. TPM creates revocation evidence $E=H(RevocationAgencyName)^{2z} \bmod n$ (if existing revocation evidence cannot be reused), and then finishes the signature by performing items 5)-7) with $d_4$ in 4).

Alternatively, in order to make minimal TPM storage, instead of $c=H(g\|h\|a\|b\|T_1\|T_2\|T_3\|d_1\|d_2\|d_3\|E\|d_4\|m)$, TPM can compute c as follows:

$c_1=H(g\|h\|a\|b)$, $c_2=H(c_1\|T_1)$, $c_3=H(c_2 T_2)$, $c_4=H(c_3\|T_3)$, $c_5=H(c_4\|d_1)$, $c_6=H(c_5\|d_2)$, $c_7=H(c_6\|d_3)$, $c_8=H(c_7\|E)$, $c_9=H(c_8\|d_4)$, $c=H(c_9\|m)$.

Therefore, signing process can be implemented as follows:
1. TPM imports a, b, g, h (320-bit), n (2048-bit).
2. TPM imports $c_1$ (160-bit).

Off-Line Computations
1. TPM obtains a TPM-specific secret $w_1$ (160-bit) from the RNG.
2. TPM obtains a TPM-specific secret $w_2$ (160-bit) from the RNG
3. TPM obtains a TPM-specific secret $r_1$ (380-bit) from the RNG.
4. TPM obtains a TPM-specific secret $r_2$ (380-bit) from the RNG.
5. TPM obtains a TPM-specific secret $r_3$ (380-bit) from the RNG.
6. TPM obtains a TPM-specific secret $r_4$ (380-bit) from the RNG.
7. TPM stores $w_1, w_2, r_1, r_2, r_3, r_4$ as part of a new set A.
8. TPM computes a non-secret value $T_1$ (2048-bit)=$u^*(h^{w_1})$.
9. TPM computes $C_2 = H(c_1 \| T_1)$.
10. TPM exports $T_1$.
11. TPM computes a non-secret value $T_2$ (2048-bit)=$g^{w_1}$.
12. TPM computes $c_3 = H(c_2 \| T_2)$.
13. TPM exports $T_2$.
14. TPM computes a non-secret value $T_3$ (2048-bit)= $(h^e)^*(g^{w_2})$.
($h^e$ could be computed only once and permanently stored in secret).
15. TPM computes $c_4 = H(c_3 \| T_3)$.
16. TPM exports $T_3$.
17. TPM computes a non-secret value $d_1$ (2048-bit)= $(T_1^{r_1})^*(a^{r_2})^*(T_2^{r_3})^*(T_3^{r_4})$.
18. TPM computes $c_5 = H(c_4 \| d_1)$.
19. TPM computes a non-secret value $d_2$ (2048-bit)= $(h^{r_1})^*(g^{r_3})$.
20. TPM computes $c_6 = H(c_5 \| d_2)$.
21. TPM computes a non-secret value $d_3$ (2048-bit)=$g^{r_4}$.
22. TPM computes $c_7 = H(c_6 \| d_3)$.
23. TPM stores $C_7$ as part of set A.
On-Line Computations
1. TPM imports RevocationAgencyName (arbitrary length)
2. TPM computes f(320-bit)=(H(RevocationAgencyName))$^2$.
3. TPM saves f as part of set A.
4. TPM computes non-secret E(2048-bit)=$f^z$.
5. TPM computes $c_8 = H(c_7 \| E)$.
6. TPM exports E and erases E.
7. TPM generates $d_4$ (2048-bit)=$f^{r_2}$.
8. TPM computes $c_9 = H(c_8 \| d_4)$.
9. TPM erases $d_4$.
10. TPM imports challenge m (arbitrary length).
11. TPM computes a non-secret value $c_{10} = H(c_9 \| m)$.
12. TPM set $c = c_{10}$.
13. TPM saves c as part of set A.
14. TPM exports c.
15. TPM computes non-secret value $s_1$ (380 bits)=$r_1 - c^*(e - 2^{400})$.
16. TPM exports $s_1$.
17. TPM computes non-secret value $s_2$ (380 bits)=$r_2 + c^*z$.
18. TPM exports $s_2$.
19. TPM computes non-secret value $s_3$ (380 bits)=$r_3 - c^*w_2$.
20. TPM exports $s_3$.
21. TPM computes non-secret value $s_4$ (380 bits)=$r_4 + c^*w_1$.
22. TPM exports $s_4$.
TPM erases set A.
5. Verify (Step 805)
A verifier checks the validity of a signature (c, $s_1, s_2, s_3, s_4$, $T_1, T_2, T_3$, C)—using the example of the second version of revocation evidence, though the first version could equally well be used—of the message m by performing as follows:
1. Check if C is in a revocation list maintained by a trusted revocation agency, who has a name—RevocationAgencyName, if yes reject the signature, otherwise carry on. (As indicated above, the verifier may maintain such lists itself).
2. Compute $$c' = H(g \| h \| y \| a \| b \| T_1 \| T_2 \| T_3 \| C \|$$

$$b^c T_1^{s_1 - c2^n}/(a^{s_2 - c2^{\lambda_1}} y^{s_3}) \bmod n \| T_2^{s_1 - c2^n}/g^{s_3} \bmod n \|$$

$$T_2^c g^{s_4} \bmod n \| T_3^c g^{s_1 - c2^{r_1}} h^{s_4} \bmod n \| (af)^{s_2 - c2^{\lambda_1}} C^c \bmod n \| m).$$

3. Accept the signature if and only if c=c', and $s_1 \in \pm\{0, 1\}^{\epsilon(\gamma_2 + k) + 1}$, $s_2 \in \pm\{0, 1\}^{\epsilon(\lambda_2 + k) + 1}$, $s_3 \in \pm\{0, 1\}^{\epsilon(\lambda_1 + 2l + k + l) + 1}$, and $s_4 \in \pm\{0, 1\}^{\epsilon(2l + k) + 1}$.

6. Revocation (Step 806)
If, for whatever reason, a TPM should be revoked for a particular purpose identified by RevocationAgencyName, C is placed in a revocation list. In different embodiments, this may be a list maintained by a Revocation Agency, or may be made available to potential verifiers for them to maintain their own lists.

The security of the scheme will now be considered. The security of the ACJT group signature scheme is based on the strong RSA assumption and decisional Diffie-Hellman assumption.

The strong RSA assumption (see for example: N. Barić and B. Pfitzmann "Collision-free accumulators and fail-stop signature schemes without trees", in *Advances in Cryptology—EUROCRYPT '97*, LNCS 1233, pp. 480-494, Springer-Verlag, 1997; E. Fujisaki and T. Okamoto, "Statistical zero knowledge protocols to prove modular polynomial relations" in *Advances in Cryptology—CRYPTO '97*, LNCS 1297, pp. 16-30, springer-Verlag, 1997) strengthens the widely accepted RSA assumption that finding $e^{th}$-roots modulo n—where e is the public, and thus fixed, exponent—is hard to the assumption that finding an $e^{th}$-root modulo n for any e>1 is hard.

Definition of Strong RSA Problem—Let n=pq be an RSA-like modulus and let G be a cyclic subgroup of $Z^*_n$ of order #G, $\lceil \log_2(\#G) \rceil = 1_G$. Given n and z∈G, the String RSA Problem consists of finding u∈G and e∈$Z_{>1}$ satisfying z≡$u^e$ mod n.

Definition of Strong RSA Assumption—There exists a probabilistic polynomial-time algorithm K which on input a security parameter $1_G$ outputs a pair (n, z) such that, for all probabilistic polynomial-time algorithns P, the probability that P can solve tile Strong RSA Problem is negligible.

The Diffie-Helhnan Assumption (W. Diffie and M. E. Hellman "New directions in cryptography", *IEEE Transactions on Information Theory*, IT-22(6): 644-654, 1976.) appears in two "flavours": (i) the Computational Diffie-Helimman Assumption (CDH), and (ii) the Decisional Diffie-Hellman Assumption (DDH), (see D. Boneh, "The decision Diffie-Hellnan problem", in *Algorithmic Number Theory (ANTS-III)*, LNCS 1423, pp. 48-63, Springer-Verlag, 1998)

Definition of Decisional Diffie-Hellman Problem—Let G=(g) be a cyclic group generated by g of order #G, $\lceil \log_2(\#G) \rceil = 1_G$. Given g, $g^x$, $g^y$, and $g^z \in G$, the Decisional Diffie-Hellinan Problem consists of deciding whether the elements $g^{xy}$ and $g^z$ are equal.

This problem gives rise to the Decisional Diffie-Hellman Assumption, which was first explicitly mentioned by Brands (S. Brands "An efficient off-line electronic cash system based on the representation problem", Technical Report CS-R9323, Centrum voor Wiskunde en Informatica, April 1993) although it was already implicitly assumed in earlier cryptographic schemes.

Definition of Decisional Diffie-Hellman Assumption—There is non probabilistic polynomnial-time algorithm that distinguishes with non-negligible probability between the distributions D and R, where D=(g, $g^x$, $g^y$, $g^z$) with x, y, $z \in_R Z_{\#G}$ and R=(g, $g^x$, $g^y$, $g^{xy}$) with x, $y \in_R Z_{\#G}$.

Ateniese et al gives a security proof of the ACJT group signature scheme by proving the following two theorems and one corollary.

Theorem 1 (Coalition-resistance). Under the strong RSA assumption, a group certificate $[u_i=(a^{x_i}b)^{1/e_i} \mod n, e_i]$ with $x_i \in \Delta$ and $e_i \in \Gamma$ can be generated only by the group manager provided that the number K of certificates the group manager issues is polynomially bounded.

Theorem 2. Under the strong RSA assumption, the interactive protocol underlying the group signature scheme is a statistical zero-knowledge (honest-verifier) proof of knowledge of a membership certificate and a corresponding membership secret key.

Corollary. In the random oracle model the ACIT group signature scheme is secure under the strong RSA and the decisional Diffie-Hellinan assumption.

Based on the security proof of the ACJT group signature scheme by Ateniese et al, we can argue that in the random oracle model the group signature scheme with revocation evidence presented in the previous section is secure under the strong RSA assumption and the decisional Diffie-Hellman assumption.

Most security properties of the general group signature scheme with revocation evidence (as set out above) follow straightforwardly from the above two theorems and one corollary. Note that all the properties of the ACJT group signature scheme are retained as the amount of information revealed by (c, $s_1$, $s_2$, $s_3$, $s_4$, $T_1$, $T_2$, $T_3$) about the group member's secret and certificate is negligible (i.e., (c, $s_1$, $s_2$, $s_3$, $s_4$, $T_1$, $T_2$, $T_3$) are statistically hiding commitments and the PK-protocol is statistical zero-knowledge). It remains to argue that the amount of information further revealed by disclosing C about the group member's secret and certificate is also negligible based on the decisional Diffie-Hellman assumption.

The specific group signature scheme with revocation evidence presented above is efficient, benefiting from the fact that the ACJT group signature scheme is very efficient.

Communication: Our proposal is a signature scheme, not an interactive zero-knowledge proof scheme. To avoid replay attack, the verifier may chooses a unique message in and sends m with RevocationAgencyName (also chosen by the verifier) as a challenge to the signer, the signer then sends the signature back as a response. If the size of the RSA modulus n is 2048, which is recommended in the current TCG specification, the size of a signature is 9×log(n)=4.5 k-bit.

Computation: To make a signature, the signer needs nine modulo exponentiations. To verify a signature, the verifier needs five modulo exponentiations.

The fact that TPM needs to use nine modulo exponentiations may introduce a time delay into the process of verifying a TPM's identity. This time delay can be minimised by pre-computing the TPM's group signature on randomly chosen data, and then using the challenge/response to prove that that signature was generated by the TPM. The challenge/response then requires two on-line modulo exponentiations by the TPM and seven (the original five plus an extra two) by the verifier. Using essentially the same idea as in the DP scheme, we let TPM create a group signature using the above scheme on a randomly chosen message m' and a randomly chosen RevocationAgencyName[1] for a non-existent revocation agency. In that signature, f'=H(RevocationAgencyName)[2] mod n, and C'=$(af)^z$ mod n. Later, during a real communication with a challenger, the challenger sends information about a real revocation agency, RevocationAgencyName, and a fresh message, m, as a challenge. Then the TPM creates real revocation evidence C=$(af)^z$ mod n, where f=H(RevocationAgencyName)[2] mod n. The TPM then creates a signature to show the knowledge and equality of two discrete logarithms of C and C' with bases af and af' respectively, by performing as follows:

1. Randomly choose $r \in_R \pm \{0, 1\}^{\epsilon(\lambda_2+k)}$.
2. Compute c=H(a||f||f'||C||C'||$(af)^r$ mod n||$(af')^r$ mod n||m).
3. Compute s=r−c(z−$2^{\lambda_1}$) (in z).
4. Output (c, s, C).

To verify this signature, the challenger performs as follows:

1. Check if C is in a relevant revocation list (for example, as maintained by a chosen revocation agency) which has a name—RevocationAgencyName, if yes reject the signature, otherwise carry on.
2. Compute c'=H(a||f||f'||C||C'||$(af)^{s-c2^{\lambda_1}}C^c$ mod n||$(af')^{s-c2^{\lambda_1}}C'^c$ mod n||m).
3. Accept the signature if and only if c=c', and $s_2 \in \pm \{0, 1\}^{\epsilon(\lambda_2+k)+1}$.

The approach to revocation in this second scheme is broadly similar to that set out in the first scheme. Again, the system involves four sets of entities: TPM manufacturers, TPMs, Revocation Agencies (RAs), and remote service providers RSPs.

As before, we set out a scenario of applications: a TPM desires to communicate with an RSP for accessing a particular application purpose $P_A$. The RSP believes that an RA is trusted to maintain a revocation list of those TPMs which should not be allowed to access $P_A$. The revocation list has a unique identity, RevocationAgencyName=$P_A$||RA's identity||expiry date|| . . . .

In our group signature scheme with revocation evidence as specified above, the RA maintains such a revocation list with the value C belong to those rogue TPMs and makes it available to RSPs. During the verification of a signature, each RSP first check if C is in the revocation list. If yes, RSP rejects this TPM.

Optionally, this RA can also play the role of a Certificate Authority (we call it RA/CA). In this case the RA/CA is the verifier in the scheme of group signatures with revocation evidence. The RA/CA has a traditional asymmetric key pair, $P_{RA/CA}$ and $S_{RA/CA}$, which are accessible by RSPs. After the verification of a TPM's group signature succeeds, the RA/CA certifies a randomly chosen identity with an asymmetric key pair, $P_{TPM}$ and $S_{TPM}$, by using $P_{RA/CA}$ and $S_{RA/CA}$ in a usual way (as the same as the private CA in the current version of TCG specification) and records C and the certificate of $P_{TPM}$. Optionally, the RA/CA records C with $P_{TPM}$ for internal access only and lists $P_{TPM}$ in a publicly accessible revocation list. Note that this differs from the current version of TCG specification, in that this RA/CA is not given any TPM's endorsement key certificate.

In the same way as the current version of TCG specification, to access a service provided by the RSP, the TPM authenticates itself to the RSP with the certificate of $P_{TPM}$. The RSP verifies the certificate and also checks whether this certificate is in RA/CA's revocation list.

Obviously, if a TPM is listed in $RA_1$'s revocation list linked with the purpose $P_A$, the TPM can still access (1) the purpose $P_B$ also managed by $RA_1$; (2) the purpose $P_A$ but managed by $RA_2$; and of course (3) the purpose $P_B$ managed by $RA_2$.

It is of course possible to use multiple revocation lists. For example, if two revocation lists needed to be checked in one application: one based on RevocationAgencyName$_1$ and the other based on RevocationAgencyName$_2$, the TPM will have to make two revocation evidences, one called $C_1$ based on RevocationAgencyName$_1$ and the other called $C_2$ based on RevocationAgencyName$_2$.

In this scheme, if a rogue TPM's endorsement key and key certificate have been published, any verifier can check whether a given group signature with revocation evidence is signed under the endorsement key and certificate.

Using this scheme, there are a variety of different ways in which the issue of TPM ownership may be addressed. First of all, the use of an OEM (original equipment manufacturer) certificate will be considered—the OEM takes manufactured TPMs and integrates them into a computing platform host. There are at least three possible solutions for this, as follows.

Solution 1. In this solution, the TPM manufacturer plays a role as Certificate Issuer and the OEM plays a role as a Revocation Agency. TPM has a special evidence related to a certain OEM, that is (employing the first version of evidence set out above) $E_{OEM}=(H(OEM\text{-}Name))^{2z}$. This evidence can be generated by CI (the TPM manufacturer) in the TPM setup process, or alternatively generated by TPM. To convince the OEM that TPM is a genuine TPM, TPM sends the OEM a signature as set out above that has $E_{OEM}$ as E. After verifying the signature, the OEM issues a certificate on $E_{OEM}$ that could be a traditional PKI certificate. This solution does not offer the anonymity property, because $E_{OEM}$ is unique for TPM.

Solution 2. In this solution, both the TPM manufacturer and the OEM play a role as a CI in the scheme. TPM has one private endorsement key, z, and two related certificates (u, e) and (u', e'). The first one is issued by the TPM manufacturer as described in Section 3, and the second one is issued by the OEM in the same way. The TPM manufacturer has a public key (a, b, g, h, n) and TPM has related (u, e) (as described in Section 3). The OEM has a public key (a', b', g', h', n'). To convince the OEM of the correctness of TPM, TPM sends the OEM a second scheme signature under (z, e, u) on a message $m=a'^z$ mod n' (which may concatenate with a challenge from the OEM). After verifying the second scheme signature succeeds, the OEM issues (u', e') to TPM, where $u'^{e'}a'^zb'$ mod n' holds. After that, TPM responds any challenge of requesting of the TPM manufacturer's certificate by sending a second scheme signature under (z, u, e) and (a, b, g, h, n), and responds any challenge requesting of the OEM's certificate by sending a second scheme signature under (z, u', e') and (a', b', g', h', n'). This solution can offer anonymity if the second scheme signatures are of different revocation evidences. The potential problem is that processing between the TPM and the OEM is cost.

Solution 3. In this solution, the TPM manufacturer plays the same role as in the current version of TCG and the OEM plays a role as a CI in the second scheme. During the TPM manufacture, TPM obtains an ordinary endorsement key pair (as described in the existing TCG specification, but termed here pre-endorsement key pair). When the TPM manufacturer chips TPMs to the OEM, the TPM manufacturer sends a list of endorsement public keys. The OEM creates a replaced endorsement key and certificate for each TPM by using Version 1 of the JOIN process discussed above.

1. The OEM randomly chooses an exponent $z \epsilon_R ]1, 2^{l_2}]$ as TPMs endorsement private key, and computes $v=a^z$.
2. The OEM generates the endorsement key certificate (u, e) by selecting a random prime $e \epsilon_R [2^{l_3}1, 2^{l_3}+s^{l_2}]$ and computing $u=(vb)^{1/e}$.
3. The OEM encrypts (z, u, e) on TPMs pre-endorsement public key.
4. The OEM publishes the encrypted (z, u, e) and a hash value of the pre-endorsement public key in a public domain.
5. The OEM erases all of its knowledge of (z, u, e).
6. When a TCG platform with TPM is received by a user, the platform downloads the encrypted (z, u, e) from the OEM's public domain and TPM decrypts (z, u, e) by using the pre-endorsement private key.

There are at least two possible solutions for taking ownership using the second scheme, both of which are based on the above OEM certificate solutions, and are as follows.

Solution 1. It is suitable for both Solutions 1 and 2 above. The owner of the TCG platform uses $(f_{OEM}=(H(OEM\text{-}Name))^2, E_{OEM}, n)$ as a public ElGamal encryption key of TPM. The corresponding private ElGamal decryption key is TPMs endorsement private key z. The taking ownership protocol ran between the owner and TPM is as follows:

1. The owner chooses an ownership secret at random, $s \epsilon_R [1, 2^{160}]$.
2. The owner encrypts s under $f_{OEM}, E_{OEM}, n$) by using an ElGamal-encryption. To do this, The owner chooses a session secret at random, $x \epsilon_R [1, 2^{160}]$, and computes $U=f_{OEM}^{(-x)}$, and $V=s*E_{OEM}^x$.
3. The owner sends (U, V) to TPM.
4. TPM decrypts s by computing $s=V*U^z$.

The decryption process requires one modular exponentiation and one modular multiplication. There is no new function for TPM needed.

Solution 2. It is suitable for Solution 3 above. The owner of the TCG platform uses the pre-endorsement public key as an encryption key of TPM. The corresponding decryption key is TPM's pre-endorsement private key. The taking ownership protocol run between the owner and TPM is as the same as in the existing TCG specification.

The invention claimed is:

1. A method of determining access to computational resources by means of a group signature scheme with revocation evidence, the method comprising:
a certificate issuer holding a group secret key and providing a group public key;
a group member obtaining a membership secret and the certificate issuer providing a membership certificate for the group member in respect of the membership secret;
the group member using a computing apparatus to demonstrate possession of a valid membership secret and a valid membership certificate to a verifier without revealing the membership secret or the membership certificate to the verifier, wherein demonstrating possession includes generating a signature and revocation evidence from the membership secret and a revocation parameter and providing the signature and the revocation evidence to the verifier; and
the verifier determining from the signature and from the revocation evidence that the group member possesses a valid membership secret and a valid membership certificate, wherein no verifier, not even the certificate issuer, is able to identify the group member from the signature and the revocation evidence.

2. A method as claimed in claim 1, wherein the group member generates the membership secret.

3. A method as claimed in claim 1, wherein the certificate issuer generates the membership secret and the membership certificate and deletes the membership secret and the membership certificate after generation.

4. A method as claimed in claim 1, wherein the computing apparatus of the group member comprises a trusted computing device and the certificate issuer is a manufacturer of the trusted computing device.

5. A method as claimed in claim 1, wherein revocation evidence is compared by the verifier with a revocation list held by a revocation agency associated with the revocation parameter.

6. A method as claimed in claim 1, wherein revocation evidence is compared by the verifier with a revocation list held by the verifier.

7. A method of demonstrating a trust status of computational resources by a group member of a group signature scheme which has a group public key, the method comprising:

the group member obtaining a membership secret and receiving from a certificate issuer a membership certificate for the group member in respect of the membership secret; and the group member using a computing apparatus to demonstrate possession of a valid membership secret and a valid membership certificate to a verifier without revealing, even if the certificate issuer is the verifier, an identity of the group member, wherein the computing apparatus provides to the verifier a signature and revocation evidence generated from the membership secret and a revocation parameter wherein the revocation evidence comprises results from a one-way function performed on the revocation parameter.

8. A method as claimed in claim 7, wherein the revocation evidence E is of the form $E=f^z$, where f is the one-way function performed on the revocation parameter, and z is the membership secret.

9. A method as claimed in claim 7, wherein at least a part of the signature is precomputed by the computing apparatus of the group member before the signature is requested by a verifier.

10. A method as claimed in claim 7, wherein at least a part of the revocation evidence is precomputed by the computing apparatus of the group member before the revocation evidence is requested by a verifier.

11. A method of verifying a trust status of computational resources of a group member computing apparatus that is participating in a group signature scheme which has a group public key, the method comprising:

a verifier computing apparatus receiving from the group member computing apparatus a signature generated from a membership secret and a membership certificate of the group member computing apparatus, and receiving revocation evidence provided by the group member computing apparatus from its membership secret and a revocation parameter; and the verifier computing apparatus determining from the signature and from the revocation evidence that the group member computing apparatus possesses a valid membership secret and a valid membership certificate, no verifier, even a certificate issuer providing the membership certificate, being able to identify the group member computing apparatus from the signature and the revocation evidence.

12. A method as claimed in claim 11, wherein the verifier computing apparatus determining that the group member computing apparatus possesses a valid membership secret and a valid membership certificate comprises checking the revocation evidence against one or more revocation lists, determining that the revocation evidence and the signature are consistent, and that the signature is consistent with formation from a properly formed membership secret and a properly formed membership certificate.

13. A method as claimed in claim 12, wherein at least one of the one or more revocation lists is held by a revocation agency.

14. A method as claimed in claim 12, wherein at least one of the one or more revocation lists is held by the verifier computing apparatus.

15. Trusted computing apparatus comprising a processor and a memory containing a membership secret and a membership certificate issued on the membership secret by a certificate issuer for a group signature scheme having a group public key, the trusted computing apparatus being adapted to demonstrate that it possesses a valid membership secret and a valid membership certificate to a verifier without revealing the membership secret or the membership certificate to the verifier by providing a signature, and to provide a signature and revocation evidence from its membership secret, its membership certificate, the group public key and a revocation parameter, such that no verifier, not even the certificate issuer, is able to identify the trusted computing apparatus from the signature and the revocation evidence.

\* \* \* \* \*